United States Patent [19]
Gadbois et al.

[11] Patent Number: 5,903,864
[45] Date of Patent: *May 11, 1999

[54] SPEECH RECOGNITION

[75] Inventors: Gregory J. Gadbois, Amesbury; Stijn A. Van Even, Jamaica Plain, both of Mass.

[73] Assignee: Dragon Systems, Newton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/559,190

[22] Filed: Nov. 13, 1995

Related U.S. Application Data

[63] Continuation-in-part of application No. 08/521,543, Aug. 30, 1995, abandoned.

[51] Int. Cl.⁶ .................................................... G10L 5/06
[52] U.S. Cl. ........................ 704/251; 704/257; 704/275
[58] Field of Search ................................. 395/2.66, 2.61, 395/2.52, 2.09, 2.47, 2.6, 2.4, 2.42, 2.48, 2.53, 2.54, 2.56, 2.58, 2.59, 2.64, 2.84; 704/253, 9, 270

[56] References Cited

U.S. PATENT DOCUMENTS

| | | | |
|---|---|---|---|
| 4,156,868 | 5/1979 | Levinson | 395/2.6 |
| 4,277,644 | 7/1981 | Levinson et al. | 395/2.5 |
| 4,349,700 | 9/1982 | Pirz et al. | 395/2.5 |
| 4,355,302 | 10/1982 | Aldefeld et al. | 395/2.52 |
| 4,400,828 | 8/1983 | Pirz et al. | 395/2.47 |
| 4,618,984 | 10/1986 | Das et al. | 704/244 |
| 4,624,008 | 11/1986 | Vensko et al. | 395/2.62 |
| 4,677,569 | 6/1987 | Nakano et al. | 395/2.84 |
| 4,811,243 | 3/1989 | Racine | 395/326 |
| 4,827,520 | 5/1989 | Zeinstra | 395/2.84 |
| 4,837,831 | 6/1989 | Gillick et al. | 395/2.54 |
| 4,866,778 | 9/1989 | Baker | 395/2.63 |
| 4,921,107 | 5/1990 | Hofer | 209/546 |
| 4,931,950 | 6/1990 | Isle et al. | 395/11 |
| 4,972,485 | 11/1990 | Dautrich et al. | 395/2.6 |
| 5,131,045 | 7/1992 | Roth | 395/2.46 |
| 5,148,367 | 9/1992 | Saito et al. | 395/795 |
| 5,202,952 | 4/1993 | Gillick et al. | 395/2.09 |
| 5,222,188 | 6/1993 | Hutchins | 395/2.09 |
| 5,228,110 | 7/1993 | Steinbiss | 395/2.09 |
| 5,231,670 | 7/1993 | Goldhor et al. | 395/2.84 |
| 5,233,681 | 8/1993 | Bahl et al. | 704/251 |
| 5,241,619 | 8/1993 | Schwartz et al. | 395/2.09 |
| 5,267,345 | 11/1993 | Brown et al. | 395/2.64 |

(List continued on next page.)

FOREIGN PATENT DOCUMENTS

| | | | |
|---|---|---|---|
| 0 645 757 | 3/1995 | European Pat. Off. | 704/270 |
| 0 655 732 | 5/1995 | European Pat. Off. | 704/251 |
| 6-149879 | 5/1994 | Japan . | |
| WO 95/14974 | 6/1995 | WIPO . | |
| WO 96 13030 | 5/1996 | WIPO | 704/231 |

OTHER PUBLICATIONS

Occena, et al., "A logic–based framework for address interpretation and rectification," *Computers in Industry*, 20:63–73, (Jul. 1992).

(List continued on next page.)

*Primary Examiner*—David R. Hudspeth
*Assistant Examiner*—Donald L. Storm
*Attorney, Agent, or Firm*—Fish & Richardson P.C.

[57] ABSTRACT

A method of speech recognition includes recognizing a first utterance, recognizing a second utterance having information that is related to the first utterance, and determining the most probable first and second utterances based on stored information about valid relationships between possible first and second utterances. The most probable second utterance contains information that is semantically related to the most probable first utterance. The recognized first utterance may be recognized continuously and the recognized second utterance may be recognized discretely. The determination of the most probable utterances may include creating a list of possible utterances that could be confused with a recognized utterance and rerecognition of a list of possible utterances against an utterance.

43 Claims, 44 Drawing Sheets

U.S. PATENT DOCUMENTS

| | | | |
|---|---|---|---|
| 5,377,303 | 12/1994 | Firman | 392/2.84 |
| 5,444,673 | 8/1995 | Mathurin | 368/63 |
| 5,454,063 | 9/1995 | Rossides | 395/2.84 |
| 5,500,920 | 3/1996 | Kupiec | 704/270 |
| 5,613,034 | 3/1997 | Ney et al. | 395/2.6 |
| 5,677,834 | 10/1997 | Mooneyham | 364/188 |
| 5,737,724 | 4/1998 | Atal et al. | 704/251 |

OTHER PUBLICATIONS

Yamaoka, et al., "Method for Predicting Utterances Using a Layered Plan Recognition Model—Disambiguation of Speech Recognition Candidates . . . ," *Systems & Computers in Japan,* 25:74–91, (Apr. 1994).

Marx, Matt and Schmandt, Chris—Avios '94 Proceedings—"Reliable Spelling Despite Poor Spoken Letter Recognition"—Sep. 20–22, 1994.

Kaspar et al., "Speech recognition by spelling for large vocabularies", NTG–Fachberichte, vol. 94, pp. 31–36, Apr. 1986.

Han et al., "A voice system for the computer entry of Chinese characters", Computer Speech and Language, vol. 7, pp. 1–13, 1993.

"Alternate Input Devices Take a Load Off Wrists", Managing Office Technology, pp. 32–33, Aug. 1994.

P. Deleglise et al., "Temporal Decomposition and Acoustic–Phonetic Decoding for the Automatic Recognition of of Continuous Speech", IEEE, pp. 839–841, 1988.

Huang et al., "Spellmode Recognition Based on Vector Quantization", Speech Communication, vol. 7, pp. 41–53, 1988.

Myers et al. "An automated directory listing retrieval system based on recognition of connected letter strings", J. Acoust. Soc. Am., vol. 71(3), Mar. 1982.

Cole et al. "English Alphabet Recognition with Telephone Speech", Oregon Graduate Institute of Science and Technology, pp. 479–481.

Mandel, "A Commercial Large–Vocabulary Discrete Speech Recognition System: Dragondictate*", Language and Speech, 1992, 35(1,2), 237–246.

Stephen E. Levinson, "The Vocal Speech Understanding System," in Advance Papers of the Fourth International Joint Conference on Artificial Intelligence, IJCAI–75, Tblisi, Georgia (Sep. 3–8, 1975).

Matt Marx and Chris Schmandt, "Reliable Spelling Despite Poor Spoken Letter Recognition," in AVIOS '94, Proceedings of the 13th Annual International Voice Applications Conference, Silicon Valley/San Jose, California, Sep. 20–22, 1994.

Confusability Array (of Probabilities)

Hypothesized

| Recognized | 0 | 1 | 2 | 3 | 4 | 5 | 6 | 7 | 8 | 9 |
|---|---|---|---|---|---|---|---|---|---|---|
| 0 | 1, | 0.0204, | 0.0497, | 0.0356, | 0.0193, | 0.0216, | 0.0204, | 0.0228, | 0.0001, | 0.0001, |
| 1 | 0.0155, | 1, | 0.0001, | 0.0001, | 0.0917, | 0.0734, | 0.0001, | 0.0421, | 0.0001, | 0.0301, |
| 2 | 0.0734, | 0.0204, | 1, | 0.1888, | 0.0398, | 0.0285, | 0.1211, | 0.0526, | 0.0421, | 0.0301, |
| 3 | 0.0094, | 0.0001, | 0.0497, | 1, | 0.0001, | 0.0285, | 0.0285, | 0.0001, | 0.0588, | 0.0497, |
| 4 | 0.0155, | 0.0917, | 0.0216, | 0.0216, | 1, | 0.0657, | 0.0001, | 0.0588, | 0.0001, | 0.0301, |
| 5 | 0.0094, | 0.0204, | 0.0001, | 0.0301, | 0.0193, | 1, | 0.0001, | 0.0001, | 0.0001, | 0.1353, |
| 6 | 0.0053, | 0.0001, | 0.0285, | 0.0356, | 0.0001, | 0.0285, | 1, | 0.0001, | 0.0001, | 0.0001, |
| 7 | 0.0094, | 0.0001, | 0.0216, | 0.0216, | 0.0193, | 0.0285, | 0.0001, | 1, | 0.0001, | 0.0301, |
| 8 | 0.0155, | 0.0270, | 0.0337, | 0.0374, | 0.0001, | 0.0001, | 0.0285, | 0.0001, | 1, | 0.0001, |
| 9 | 0.0001, | 0.0001, | 0.0216, | 0.0001, | 0.0001, | 0.0285, | 0.0001, | 0.0001, | 0.0228, | 1, |

FIG. 5

| | | | Probability of Confusing | Confusion |
|---|---|---|---|---|
| n=1: Recognized Digit=0 | 0 1 | Code 0____ | 1 | 1 |
| n=2: Recognized Digit=3 | 1 2 | 01___ 02___ | 0.0001 0.0497 | 0.0001 0.0497 |
| n=3 Recognized Digit=1 | 0 1 2 3 4 5 6 7 | 020__ 021__ 022__ 023__ 024__ 025__ 026__ 027__ | 0.0155 1 0.0001 0.0001 0.0917 0.0734 0.0001 0.0421 | (.0497)(.0155)=0.0007 0.0497 0 0 0.00456 0.00365 0 0.00209 |
| n=4 Recognized Digit=1 | 0 1 2 3 4 5 6 7 8 9 | 0210_ 0211_ 0212_ 0213_ 0214_ 0215_ 0216_ 0217_ 0218_ 0219_ | 0.0155 1 0.0001 0.0001 0.0917 0.0734 0.0001 0.0421 0.0001 0.0301 | (.0497)(.0155)=0.0007 0.0497 0 0 0.00456 0.00365 0 0.00209 0 0.0015 |
| n=5 Recognized Digit=2 | 0 1 2 3 4 5 6 7 8 9 | 02110 02111 02112 02113 02114 02115 02116 02117 02118 02119 | .0734 .0204 1 .1888 .0398 .0285 .1211 .0526 .0421 .0301 | (.0497)(.0734)=.00365 .0010 .0497 .0094 .002 .0014 .006 .0026 .0021 .0015 |
| n=5 | 0 1 2 3 4 5 6 7 8 9 | 02140 02141 02142 02143 02144 02145 02146 02147 02148 02149 | .0734 .0204 1 .1888 .0398 .0285 .1211 .0526 .0421 .0301 | (.00456)(.0734)=.00033 0 .00456 .00086 .00018 .00013 .00055 .0002 .00019 .00014 |

FIG. 6

| Zip Code | Confusion Value |
|---|---|
| 02112 | 0.0497 |
| 02113 | 0.0094 |
| 02116 | 0.00456 |
| 02142 | 0.00456 |
| 02412 | 0.00456 |
| 02110 | 0.00365 |
| 02152 | 0.00365 |
| 02512 | 0.00365 |
| 02117 | 0.0026 |
| 02118 | 0.00209 |
| 02172 | 0.00209 |
| 02712 | 0.00209 |
| 02114 | 0.002 |
| 02119 | 0.0015 |
| 02192 | 0.0015 |
| 02115 | 0.0014 |
| 02111 | 0.001 |
| 02143 | 0.00086 |
| 02413 | 0.00086 |
| 02102 | 0.00077 |
| 02012 | 0.00077 |
| 02153 | 0.00069 |
| 02513 | 0.00069 |
| 02146 | 0.00055 |
| 10173 | 0.00039 |
| 02713 | 0.00039 |
| 02140 | 0.00033 |
| 02542 | 0.00033 |
| 02147 | 0.0002 |
| 02748 | 0.00019 |

FIG. 7

Permutation

FIG. 13a-1

```
B
    sil       a        b        c        d        e        f        g        h        i        j        k        l        m        n        o        p        q        r
    s         t        u        v        w        x        y        z        0        1        2        3        4        5        6        7        8        9 sil 0.000000  0.002951 0.655987 0.000447 0.011813 0.000168 0.001145 0.000191 0.003321 0.000025 0.000330
    0.002412 0.001016 0.000613 0.004323 0.007841 0.011988 0.002165 0.003379 0.001689 0.001680 0.000165 0.000531
    0.007866 0.000158 0.000036 0.000018 0.000541 0.000013 0.000053 0.000007 0.000038 0.001019 0.000016 a   0.000000  0.019282 0.530218 0.000610 0.010789 0.017751 0.000224 0.001030 0.000178 0.002747 0.000166 0.001532
    0.002171  0.000914 0.000552 0.004990 0.008293 0.000060 0.003522 0.005117 0.002705 0.003631 0.005700 0.000148 0.000644
    0.007080  0.000163 0.000032 0.000292 0.000487 0.000012 0.000012 0.000048 0.000006 0.000034 0.025897 0.000054 b   0.000000  0.003086 0.452850 0.000402 0.009300 0.009422 0.000151 0.001030 0.000172 0.009661 0.000023 0.000297
    0.002171  0.000914 0.000552 0.004522 0.007057 0.000046 0.001948 0.003041 0.001526 0.001520 0.019351 0.000148 0.000478
    0.037817  0.000142 0.000032 0.000016 0.000487 0.000012 0.000012 0.000048 0.000006 0.000034 0.001101 0.000014 c   0.000000  0.002656 0.086040 0.002740 0.010789 0.013360 0.000140 0.001030 0.000172 0.002988 0.000023 0.000297
    0.002656  0.000552 0.010860 0.007057 0.000046 0.001948 0.003041 0.001190 0.001520 0.001512 0.000148 0.000478
    0.007080  0.000142 0.000032 0.000016 0.000487 0.000020 0.000012 0.000048 0.000010 0.000034 0.000110 0.000917 0.000014 d   0.000000  0.002656 0.036800 0.000350 0.010789 0.001410 0.001948 0.001030 0.001000 0.001030 0.000172 0.002988 0.000023 0.000297
    0.002656  0.000552 0.003891 0.007890 0.000046 0.001948 0.003041 0.001000 0.001520 0.001512 0.000148 0.000478
    0.007080  0.000142 0.000032 0.000030 0.000487 0.000010 0.000030 0.000048 0.000010 0.000034 0.000917 0.000014 e   0.000000  0.011145 0.200916 0.006667 0.017673 0.097558 0.000151 0.001030 0.000172 0.002988 0.000023 0.000297
    0.008575  0.000914 0.000552 0.003891 0.048040 0.000046 0.008971 0.011736 0.022734 0.003090 0.001512 0.000875 0.000478
    0.009143  0.000142 0.000032 0.000016 0.000487 0.000012 0.000012 0.000048 0.000006 0.000034 0.000917 0.000014 f   0.000000  0.002656 0.030420 0.000402 0.010789 0.000831 0.000160 0.001030 0.000172 0.002988 0.000023 0.000297
    0.002171  0.000914 0.000552 0.003891 0.007057 0.000046 0.001948 0.003041 0.001190 0.001520 0.001512 0.000148 0.000478
    0.007080  0.000142 0.000032 0.000016 0.000487 0.000010 0.000010 0.000048 0.000010 0.000034 0.000917 0.000020 g   0.000000  0.002656 0.000332 0.000402 0.175007 0.009246 0.000151 0.040180 0.005769 0.025523 0.000023 0.000297
    0.002171  0.000914 0.000552 0.010004 0.007057 0.000004 0.001868 0.003041 0.001190 0.001520 0.006230 0.000148 0.000478
    0.103141  0.000142 0.000032 0.000016 0.000487 0.000012 0.000012 0.000048 0.000006 0.000034 0.000917 0.000014 h   0.000000  0.002656 0.000470 0.000402 0.018850 0.012150 0.000151 0.001030 0.000172 0.002988 0.000023 0.000297
    0.002171  0.000914 0.000552 0.003891 0.007057 0.000046 0.001948 0.004800 0.001190 0.001520 0.001512 0.000148 0.000478
    0.012100  0.000142 0.000032 0.000016 0.017730 0.000010 0.000010 0.000048 0.000010 0.000034 0.000917 0.000014 i   0.000000  0.002656 0.506389 0.000402 0.010789 0.030317 0.000151 0.001030 0.011373 0.001020 0.000321 0.028698 0.000051 0.000297
    0.002350  0.000658 0.003891 0.008311 0.000363 0.001560 0.001948 0.004800 0.001020 0.001520 0.003698 0.000148 0.000478
    0.016871  0.000142 0.000032 0.000016 0.000487 0.000012 0.000012 0.001598 0.000006 0.000034 0.000917 0.000398
```

| sil | a | b | c | d | e | f | g | h | i | j | k | l | m | n | o | p | q | r |
|---|---|---|---|---|---|---|---|---|---|---|---|---|---|---|---|---|---|---|
| | t | u | v | w | x | y | z | 0 | 1 | 2 | 3 | 4 | 5 | 6 | 7 | 8 | 9 | |

Deletion

| B | sil | | O | sil | | S | sil |
|---|---|---|---|---|---|---|---|
| sil | 0.072822 | | sil | 0.086846 | | sil | 0.080343 |
| a | 0.161046 | | a | 0.194318 | | a | 0.147501 |
| b | 0.263293 | | b | 0.146337 | | b | 0.095018 |
| c | 0.032190 | | c | 0.156959 | | c | 0.108293 |
| d | 0.019230 | | d | 0.159377 | | d | 0.103257 |
| e | 0.224930 | | e | 0.130249 | | e | 0.113145 |
| f | 0.004360 | | f | 0.148838 | | f | 0.126491 |
| g | 0.287205 | | g | 0.118878 | | g | 0.114896 |
| h | 0.042840 | | h | 0.147839 | | h | 0.114976 |
| i | 0.174973 | | i | 0.161874 | | i | 0.147679 |
| j | 0.000070 | | j | 0.114188 | | j | 0.000010 |
| k | 0.012310 | | k | 0.167875 | | k | 0.116405 |
| l | 0.199107 | | l | 0.125652 | | l | 0.113312 |
| m | 0.172646 | | m | 0.128615 | | m | 0.107330 |
| n | 0.080780 | | n | 0.169739 | | n | 0.107703 |
| o | 0.177360 | | o | 0.182494 | | o | 0.147365 |
| p | 0.004340 | | p | 0.147606 | | p | 0.104548 |
| q | 0.000010 | | q | 0.000010 | | q | 0.000220 |
| r | 0.182459 | | r | 0.112488 | | r | 0.133977 |
| s | 0.183513 | | s | 0.132361 | | s | 0.157915 |
| t | 0.004610 | | t | 0.157227 | | t | 0.097456 |
| u | 0.191891 | | u | 0.152357 | | u | 0.139083 |
| v | 0.002010 | | v | 0.123944 | | v | 0.103158 |
| w | 0.001350 | | w | 0.109592 | | w | 0.124114 |
| x | 0.156087 | | x | 0.157167 | | x | 0.000010 |
| y | 0.237213 | | y | 0.152881 | | y | 0.104641 |
| z | 0.000010 | | z | 0.125876 | | z | 0.000890 |
| 0 | 0.000010 | | 0 | 0.000010 | | 0 | 0.144084 |
| 1 | 0.000010 | | 1 | 0.000010 | | 1 | 0.055210 |
| 2 | 0.000010 | | 2 | 0.000010 | | 2 | 0.000010 |
| 3 | 0.000010 | | 3 | 0.000010 | | 3 | 0.000010 |
| 4 | 0.000010 | | 4 | 0.000010 | | 4 | 0.000010 |
| 5 | 0.000010 | | 5 | 0.000010 | | 5 | 0.000010 |
| 6 | 0.000010 | | 6 | 0.000010 | | 6 | 0.000010 |
| 7 | 0.000010 | | 7 | 0.000010 | | 7 | 0.018730 |
| 8 | 0.000010 | | 8 | 0.000010 | | 8 | 0.000010 |
| 9 | 0.000010 | | 9 | 0.000010 | | 9 | 0.000010 | n=1    Context=Silence
Recognized=B

Pe:   →B   .655987        $^P$B    0.655987
      →D   .04988         $^P$D    0.011988
      →E   .011813        $^P$E    0.011813

In:     E   0.010596      $^I$E    0.010596
De:         0.072822      $^D$D    0.072822

$^P$B   0.655987
n=2    Context=B
Recognized=O

Pe:   →B   0.023924       $^P$BB   0.015694
      →O   0.618126       $^P$BO   0.405482
      →W   0.016075       $^P$BW   0.010545
In:   →B   0.083845       $^I$BB   0.055001
      →O   0.076405       $^I$BO   0.050121
De:        0.146337       $^D$B    0.095995

$^P$BO   0.405482
n=3    Context=O
Recognized=S

Pe:   →A   0.011723       $^P$BOA   0.004753
      →O   0.041892       $^P$BOO   0.016986
      →S   0.539338       $^P$BOS   0.218691
In:   →O   0.160171       $^I$BOO   0.064946
      →S   0.042027       $^I$BOS   0.017041
De:        0.147365       $^D$BO    0.059754

FIG. 14a

$D_B$  0.095995 n=3   Context=B

Recognized=S

| | | | | |
|---|---|---|---|---|
| Pe: | →B | 0.023924 | $P_{BB}$ | 0.001505 |
| | →S | 0.618126 | $P_{BS}$ | 0.062869  invalid |
| De: | | 0.016075 | $P_B$ | 0.009121 |

$D$  0.072822 n=2   Context=Silence

Recognized=O

| | | | | |
|---|---|---|---|---|
| Pe: | →O | 0.873477 | $P_O$ | 0.063608 |
| De: | | 0.086846 | $D$ | 0.006324 |

FIG. 14b

$^P$O   0.63608
n=3   Context=O
Recognized=S

| Pe: | → A | 0.011723 | $^P$OA | .000746 |
|---|---|---|---|---|
|  | → O | 0.041892 | $^P$OO | .002665 |
|  | → S | 0.539338 | $^P$OS | .034306 |
| In: | → O | 0.160171 | $^I$OO | .010188 |
|  | S | 0.042027 | $^I$OS | .002673 |
| De: |  | 0.147365 | $^D$O | .009374 |

$^I$BB   0.055001
n=2   Context=B
Recognized=O

| Pe: | → B | 0.023924 | $^P$BBB |  | invalid |
|---|---|---|---|---|---|
|  | → O | 0.618126 | $^P$BBO | 0.033998 | " |
|  | → W | 0.016075 | $^P$BBW |  | " |
| In: | B | 0.083845 | $^I$BBB | 0.004612 | " |
|  | O | 0.076405 | $^I$BBO | 0.004202 | " |

$^P$BO   0.058121
n=2   Context=O
Recognized=O

| Pe: | O | 0.577351 | $^P$BOO | 0.028937 |
|---|---|---|---|---|
| In: | O | 0.173974 | $^I$BOO | 0.008720 |

FIG. 14c

$^P$BOO   0.028937
n=3   Context=O
Recognized=S

| Pe: | → A | 0.011723 | $^P$BOOA | 0.000339 |
|---|---|---|---|---|
|  | → O | 0.041892 | $^P$BOOO | 0.001212 |
|  | → S | 0.539338 | $^P$BOOS | 0.015607 |
| In: | → O | 0.160171 | $^I$BOOO | 0.004635 |
|  | → S | 0.042027 | $^I$BOOS | 0.001216 |
| De: |  | 0.147365 | $^D$BOO | 0.004264 |

$^P$BB   0.015694
n=3   Context=O
Recognized=S

| Pe: | A | 0.011723 | $^P$BBA | invalid |
|---|---|---|---|---|
|  | O | 0.041892 | $^P$BDA | " |
|  | S | 0.539338 | $^P$BBS | " |
| In: | O | 0.160171 | $^I$BBO | " |
|  | S | 0.042027 | $^I$BBS | " |
| De: |  | 0.147365 | $^D$BBB | 0.002313 |

FIG. 14d

$^P$D   0.011988 n=2   Context=D

Recognized=O

| Pe: | →D | 0.017020 | | $^P$DD | 0.000204 |
|---|---|---|---|---|---|
| | →E | 0.027756 | | $^P$DE | 0.000333 |
| | →O | 0.504343 | | $^P$DO | 0.006046 |
| In: | →P | 0.017458 | | $^P$DP | 0.000209 |
| | →Y | 0.012972 | | $^P$DY | 0.000156 |
| | →D | 0.060609 | | $^I$DD | 0.000727 |
| | →E | 0.021489 | | $^I$DE | 0.000258 |
| | →O | 0.051673 | | $^I$DO | 0.000619 |
| | →P | 0.016058 | | $^I$DP | 0.000193 |
| De: | | 0.159377 | | $^D$D | 0.001911 |

FIG. 14e

$^P E$    0.011873 n=2    Context=E

Recognized=O

| | | | | | |
|---|---|---|---|---|---|
| Pe: | E | 0.036376 | $^P EE$ | | |
| | L | 0.011255 | $^P EL$ | | |
| | N | 0.014544 | $^P EN$ | | |
| | O | 0.513147 | $^P EO$ | 0.006062 | |
| | P | 0.024011 | $^P EP$ | | |
| | T | 0.010950 | $^P ET$ | | |
| In: | E | 0.127255 | $^I EE$ | | |
| | O | 0.054643 | $^I EO$ | | |
| | P | 0.018788 | $^I EP$ | | |
| De: | | 0.130249 | $^D E$ | 0.001539 | |

$^I E$    0.010596 n=1    Context=E

Recognized=B

| | | | | | |
|---|---|---|---|---|---|
| Pe: | A | 0.011145 | $^P EA$ | | |
| | B | 0.200916 | $^P EB$ | 0.002129 | |
| | D | 0.017673 | $^P ED$ | | |
| | E | 0.097556 | $^P EE$ | | |
| | P | 0.048040 | $^P EP$ | | |
| | S | 0.011736 | $^P ES$ | | |
| | T | 0.022734 | $^P ET$ | | |
| In: | B | 0.011675 | $^I EB$ | | |
| | D | 0.014182 | $^I ED$ | | |
| | E | 0.217112 | $^I EE$ | | |
| | P | 0.036343 | $^I EP$ | | |
| | T | 0.018599 | $^I ET$ | | |
| De: | | 0.224930 | $^D E$ | | |

FIG. 14f

$^D$B
$^I$BOO
D
$^P$EO $^P$DO  0.0060461
n=3   Context=O
Recognized=S

| Pe: | → A | 0.011723 | $^P$DOA | 0.000071 |
|---|---|---|---|---|
|  | → O | 0.041892 | $^P$DOO | 0.000253 |
|  | → S | 0.539338 | $^P$DOS | 0.003261 |
| In: | → O | 0.160171 | $^I$DOO | 0.000968 |
|  | → S | 0.042027 | $^I$DOS | 0.000254 |
| De: |  | 0.147365 | $^D$DO | 0.000891 |

FIG. 14g

| operation | prefix | confusion value |
|-----------|--------|-----------------|
| P | BOS | 0.218691 |
| I | BOO | 0.064946 |
| D | BO | 0.059754 |
| P | OS | 0.034306 |
| P | BOSS | 0.015607 |
| I | OO | 0.010188 |
| D | O | 0.009374 |
| P | BOA | 0.004753 |
| I | BOOO | 0.004635 |
| P | DOS | 0.003261 |
| I | OS | 0.002673 |
| P | OO | 0.002665 |
| D | BBB | 0.002323 |

FIG. 15

SPEECH RECOGNITION

BACKGROUND

This is a continuation-in-part of U.S. Ser. No. 08/521,543, entitled "SPEECH RECOGNITION", filed Aug. 30, 1995, now abandoned. The invention relates to speech recognition.

A speech recognition system attempts to determine, either on a continuous or discrete basis, what words were intended, based on analysis of a speaker's utterances. A variety of techniques have been used to improve the accuracy of the recognition.

SUMMARY

In one aspect, the invention features a method of speech recognition including recognizing a first utterance, recognizing a second utterance having information that is related to the first utterance, and determining the most probable first and second utterances based on stored information about valid relationships between possible first and second utterances.

The method may further include determining the validity of a recognized utterance and including an invalid utterance in a list of possible utterances for comparison with the possible utterances in the list.

In some embodiments of the invention, the determination of the most probable utterances may include rerecognition of a list of possible utterances against at least one utterance.

Implementations of the method may further include the following features: ranking the list of possible utterances based upon how closely each possible utterance corresponds to the at least one utterance; creating an hypothesized list of possible utterances that relate to the at least one recognized utterance based on the stored information; comparing the ranked list of possible utterances to the hypothesized list of possible utterances for commonality between the lists; creating an hypothesized list of possible utterances that relate to the at least one recognized utterance based on the stored information; creating a list of possible utterances that could be confused with the at least one recognized utterance.

In some embodiments of the invention, the recognized first utterance is recognized continuously and the recognized second utterance is recognized discretely.

Implementations of this aspect of the method may further include the following features. A list is created of possible first utterances that may be confused with the recognized first utterance. An hypothesized list of possible second utterances is created that relate to the possible first utterances based on the stored information. The recognized second utterance is added to the hypothesized list of possible second utterances to create a merged list of possible second utterances. The merged list of possible second utterances is rerecognized against the second utterance to get a ranked list of possible second utterances, the ranking based upon how closely each possible second utterance in the merged list corresponds to the second utterance. The ranked list of possible second utterances is compared to the hypothesized list of possible second utterances for commonality between the lists, the highest ranked possible second utterance in the ranked list being compared first. An hypothesized list of possible first utterances is created from the second recognized utterance based on the stored information. The recognized first utterance is added to the hypothesized list of possible first utterances to create a merged list of possible first utterances. The merged list of possible first utterances is rerecognized against the first utterance to get a ranked list of possible first utterances having a ranking based upon how closely each possible first utterance in the merged list corresponds to the first utterance. A possible first utterance ranked second in the ranked list of possible first utterances is evaluated by determining whether a distance parameter associated with the second ranked possible first utterance is within an acceptable limit. A user is advised when the second ranked possible first utterance is not within the acceptable limit and no commonality exists between the ranked list of possible second utterances and the hypothesized list of possible second utterances.

In some embodiments of the invention, the first utterance is a zipstate and the second utterance is a city from a destination address on a package, the determination of the most probable first and second utterances resulting in the sorting of the package according to the packages destination address.

In some embodiments of the invention, the first utterance is a spelled prefix including ordered symbols and the second utterance is a word. A list is created of possible prefixes that could be confused with the recognized prefix. Creating the list of possible prefixes includes determining, in the context of a preceding symbol or silence, a probability of confusing each recognized symbol in the prefix with each symbol in a list of possible symbols, of confusing each recognized symbol in the prefix with an addition of an extra symbol preceding the recognized symbol, and of confusing each recognized symbol in the prefix with the absence of a symbol. Creating the list of possible prefixes includes replacing a sequence of symbols with a single symbol.

In some embodiments of the invention, the first utterance is a spelled word and the second utterance is a word, the determination of the most probable first and second utterances resulting in recognizing the spelled word.

In another aspect, the invention features a method of generating a choice list from a continuously recognized utterance including continuously recognizing a spoken utterance, consulting stored information to determine the probability of confusing possible utterances in the stored information with the recognized utterance, and producing a list of possible utterances from the stored information that could be confused with the recognized utterance.

The method may include rerecognizing the utterance against a merged list of the list of possible utterances and the recognized utterance to create a ranked list of possible utterances having a ranking based upon how closely each utterance in the merged list corresponds to the spoken utterance.

In another aspect, the invention features a method of recognizing ambiguous inputs including recognizing a first ambiguous input, recognizing a second ambiguous input having information that is related to the first ambiguous input, and determining the most probable first and second ambiguous inputs based on stored information about valid relationships between possible first and second ambiguous inputs.

In another aspect, the invention features a method of training a speech recognizer including prompting a user to make a first utterance including symbols, recognizing the symbols, and calculating the probability of confusing each recognized symbol with the prompted symbol. The probabilities are calculated within the context of the preceding symbol or silence.

In another aspect, the invention features a method of displaying word choices during speech recognition including recognizing an uttered word, recognizing a spelling of a prefix of the word, whereby symbols are used to spell the prefix, and displaying a list of word choices on a screen for selection, a top choice on the list corresponding to a highest ranked choice. The symbols are letters, digits, and punctuation.

Advantages of the invention may include one or more of the following. Recognition accuracy is improved considerably over prior speech recognition systems. Any two utterances containing related data can be recognized with improved accuracy. The invention can hypothesize a list of choices from a continuously recognized utterance. The invention can determine if an utterance contains invalid data. The invention can improve the ability of a recognizer to determine a word that has been spelled even though the individual letters ("b" versus "e") may be difficult to distinguish.

Other advantages and features will become apparent from the following description and from the claims.

DESCRIPTION

FIG. 5 is a confusability matrix of probabilities.

FIG. 6 is an example of calculated confusion values.

FIG. 7 is a listing of zip codes and their related confusion values.

FIGS. 13A–13C are confusability matrices of probabilities.

FIGS. 14A–14G is an example of calculated confusion values.

FIG. 15 is a listing of words and their related confusion values.

Figure 1:
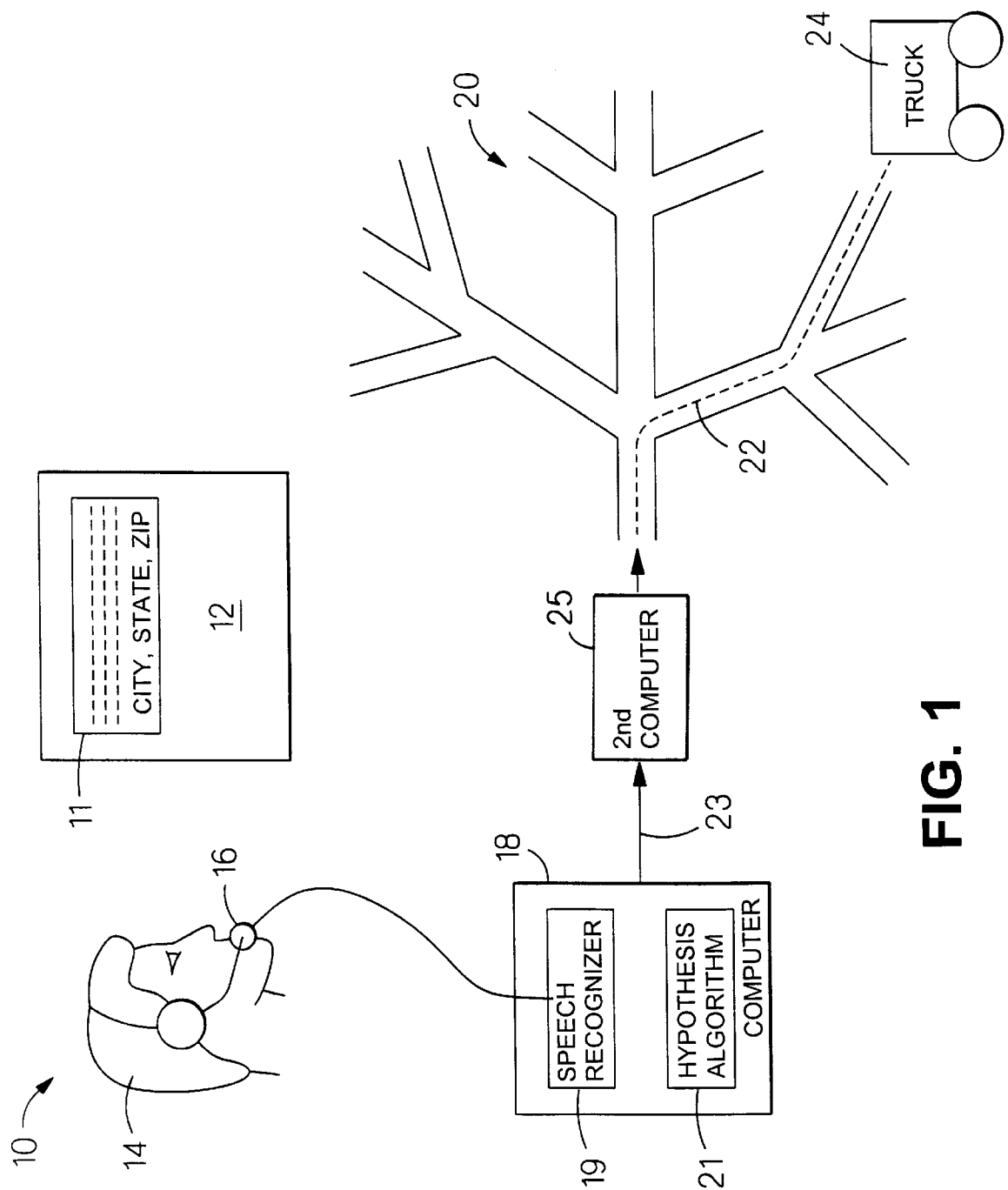
FIG. 1 is a schematic diagram of a package sorting system.

As seen in FIG. 1, in system 10 for sorting parcels 12, user 14 reads the address 11 on each parcel 12 and a microphone 16 conveys the spoken information to a computer 18. A speech recognizer 19, such as Voice Tools™ or Dragon Dictate™, available from Dragon Systems, Inc., is supplemented with an associated hypothesis algorithm 21 that determines the spoken address based on the output of the recognizer and notifies the user whether the address is valid. To find that an address is valid, in most instances system 10 must be able to determine the existence of a valid city, state and zip code combination (e.g., Somerville, Mass. 02143) from the speech recognized address; for states with one shipping destination for all cities only a valid state and zip code is required (e.g., Montana 59100).

For a valid address, the zip code information 23 is sent to a second computer 25 which routes the package along a "tree" of sorting conveyors 20, e.g., by tracking the package using electric eyes or machine readable labels. Package 12 is transported along a predetermined path 22 on conveyors 20 leading to a truck 24 going to the package's destination.

For an invalid address, the user may repeat the address or reject the package as having an invalid address.

Figure 2:
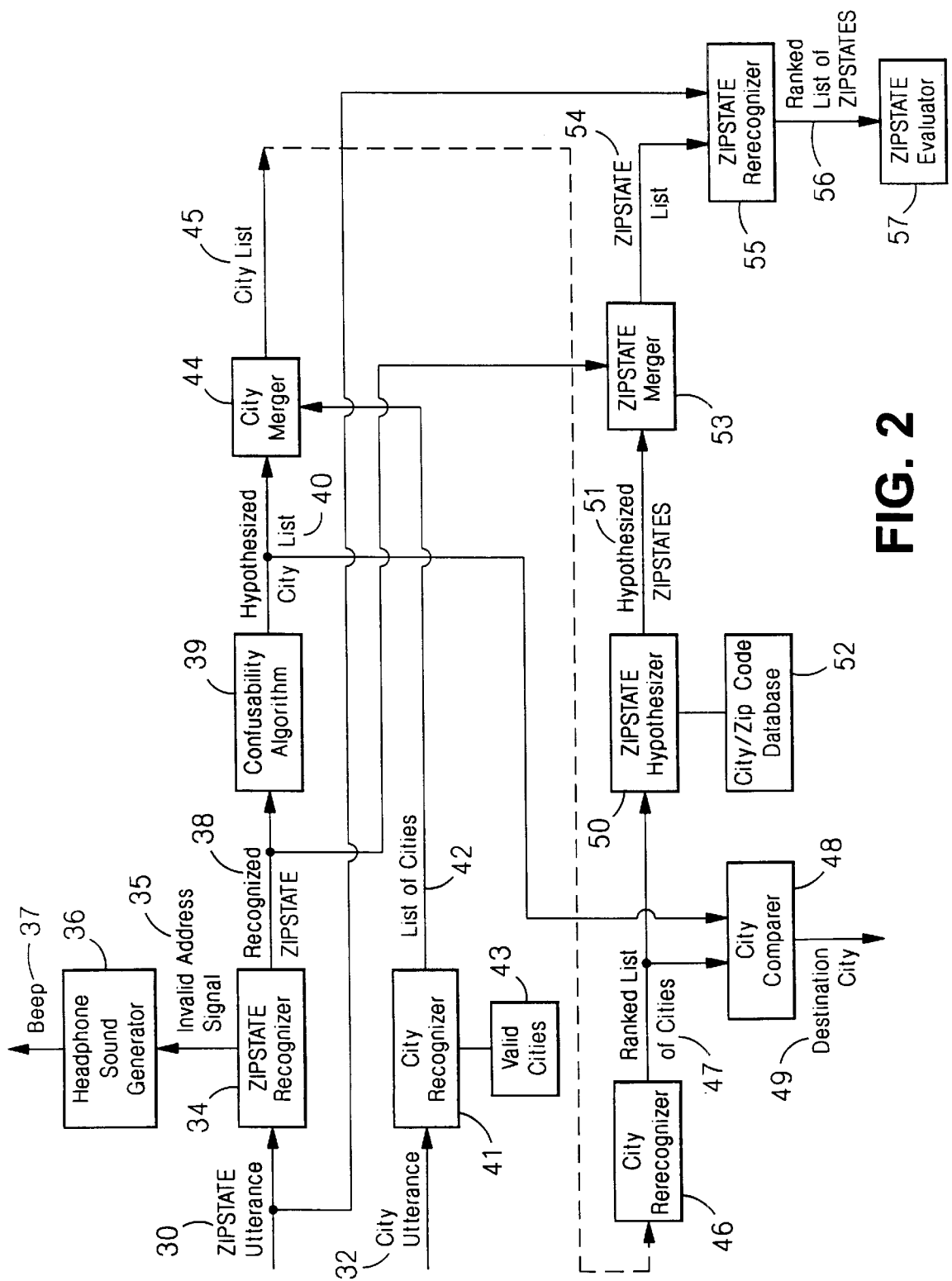
FIG. 2 is a functional block diagram of a city, state and zip code determining system.

Referring to FIG. 2, the first step in the sorting process is that the microphone receives the utterances of the "zipstate" 30 and "city" 32 on the package. The zipstate is the zip code and state spoken as one word, e.g., "02143Massachusetts". Using continuous speech recognition, zipstate recognizer 34 determines the zipstate 38 it believes corresponds to the spoken zip code and state. Each number of the zip code is recognized against a vocabulary of numbers zero through nine and the state is recognized against a vocabulary of states. If the recognizer is not able to recognize five digits and a state, the address is rejected as invalid and an invalid address signal 35 is sent to a sound generator 36 in the headphones which produces a beep 37 signaling the user that the address is invalid.

If the recognizer is able to recognize five digits and a state, a confusability algorithm 39 (described below) is run to create a list of all hypothesized cities 40 that correspond to the recognized zipstate 38 and to other zipstates that the recognizer would be likely to confuse with the recognized zipstate (these other zipstates are limited to valid zip codes within the recognized state). To this list of hypothesized cities 40 is added a list of cities 42 determined by a discrete city recognizer 41. The uttered city 32 is recognized against a vocabulary of valid cities 43 that correspond to the recognized state to produce the list 42 of possible cities.

The list of hypothesized cities 40 and the list of cities 42 are merged 44 to create a city list 45. City list 45 is then used as a city vocabulary against which the city utterance is rerecognized 46 and a ranked list of cities 47 is generated based on a determination by the recognizer of how closely it believes each city in the merged city list 45 matches the uttered city 32. The top city in the ranked list of cities 47, i.e., the best recognized city, is then compared 48 to the hypothesized cities 40. If the top city is in the hypothesized city list, that city is deemed the correct destination, and the package is routed to that city. If not, the next city in the ranked list is compared to the hypothesized city, and so on; the first match determines the destination city 49 which is delivered to the second computer 25.

If no commonality exits between the ranked list of cities 47 and the hypothesized cities 40, zipstates 51 are hypothesized 50 from the ranked list of cities 47 by consulting a database 52 of zip codes and cities. The originally recognized zipstate 38 is merged 53 with the hypothesized zipstates 51 and the resulting zipstate list 54 is used as a zipstate vocabulary against which the zipstate utterance 30 is discretely rerecognized 55 to generate a ranked list of zipstates 56 including a distance parameter associated with each zipstate signifying how poorly each zipstate was recognized as compared to the highest ranked zipstate. The highest ranked zipstate will, naturally, be the originally recognized zipstate 38. Since it is already known that no hypothesized city from the original zipstate 38 corresponds to a recognized city (if it had, the city would have been in both the ranked list of cities 47 and the hypothesized cities 40 and this step in the algorithm would not have been reached), it is the second zipstate on the ranked list that is evaluated 57. The top ranked zipstate is maintained in ranked list 56 for comparison with the other zipstates in the list to determine the distance parameter. If the distance parameter for the second zipstate is beyond an acceptable limit, e.g., if $8\log_2$confusion value (described below) of the second zipstate is more than 100 off that of the first zipstate, the package is rejected as having an invalid address and an invalid address signal is sent to the user. If the distance parameter is within the acceptable limit, the package is deemed to have a valid address and the information if delivered to second computer 25 for controlling shipment.

Figure 3:
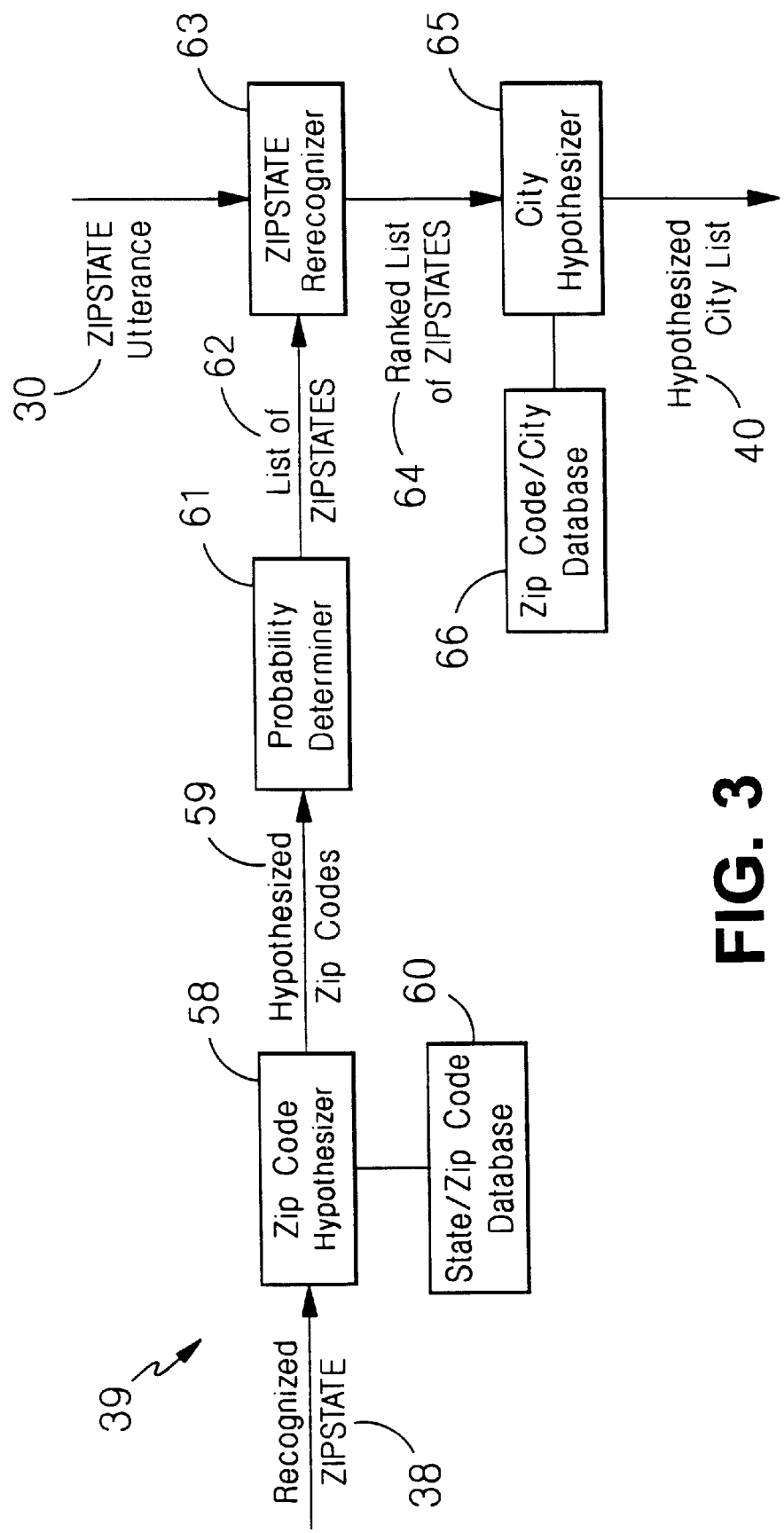
FIG. 3 is a functional block diagram of a confusability algorithm.

As seen in FIG. 3, in the confusability algorithm 39, the first step is for a zip code hypothesizer 58 to hypothesize possible valid zip codes 59 for the recognized state of zipstate 38 by consulting a database 60 of zip codes and states. The probability that the recognizer would confuse the recognized zip code with each of the hypothesized valid zip codes 59 is determined 61. The top forty zip codes, i.e., those with the highest probabilities of being confused with the recognized zip code, form a list of zipstates 62 that are then rerecognized 63 against the uttered zipstate 30 in a discrete recognition creating a ranked list 64 of the top ten zipstates. It is from this ranked list 64 of zipstates that the list of hypothesized cities 40 is created by a city hypothesizer 65 which consults a database 66 of zip codes and corresponding cities.

The discrete recognition against the list of zipstates 62 has a higher recognition accuracy rate than the original continuous recognition of the uttered zipstate. Discrete recognition of the original uttered zipstate is not done because it would require recognition against a vocabulary of $5 \times 10^{6}$ zipstates.

Figure 4A:
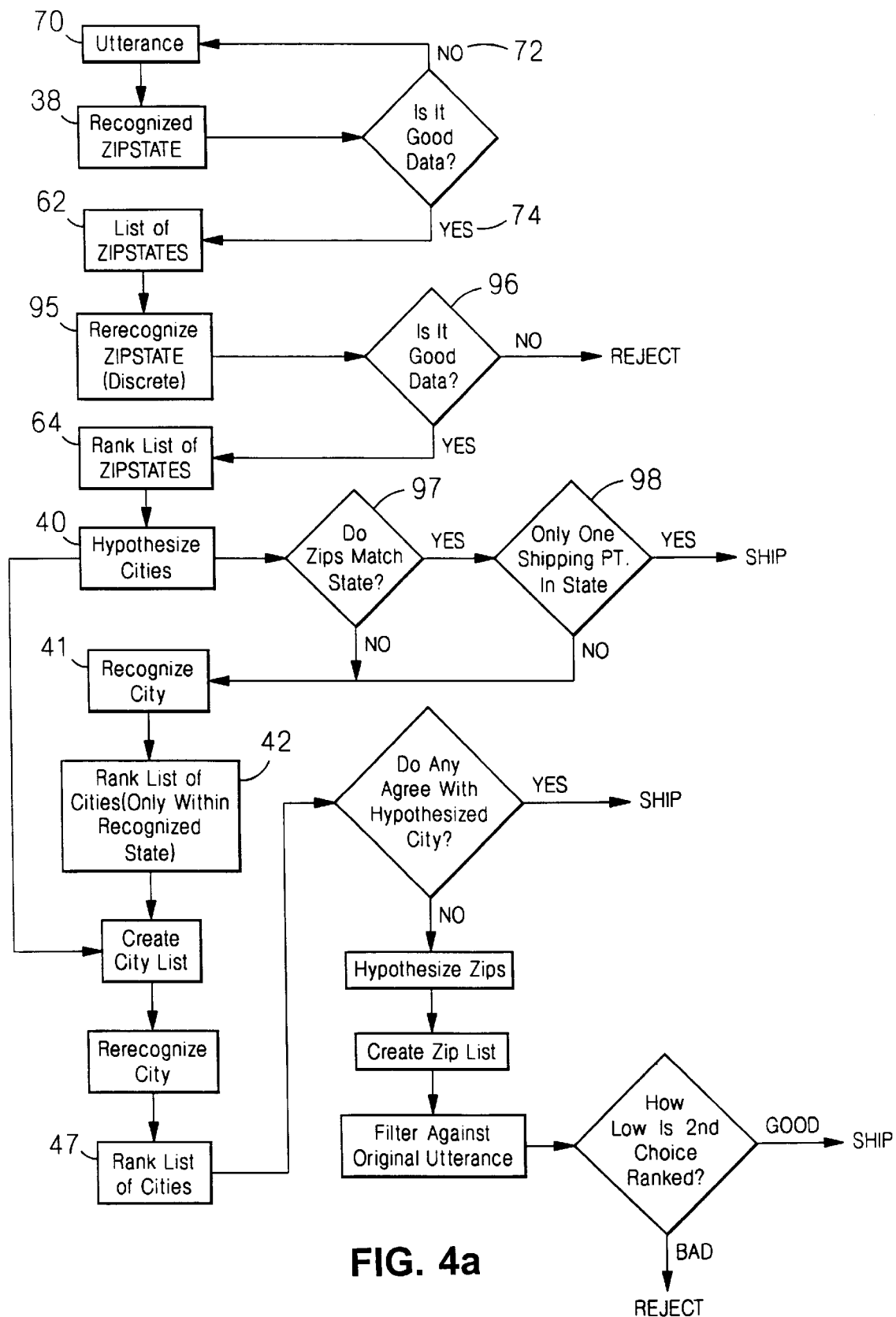
FIGS. 4A–4C are flow diagrams showing an implementation of the address determining system.
Figure 4B:
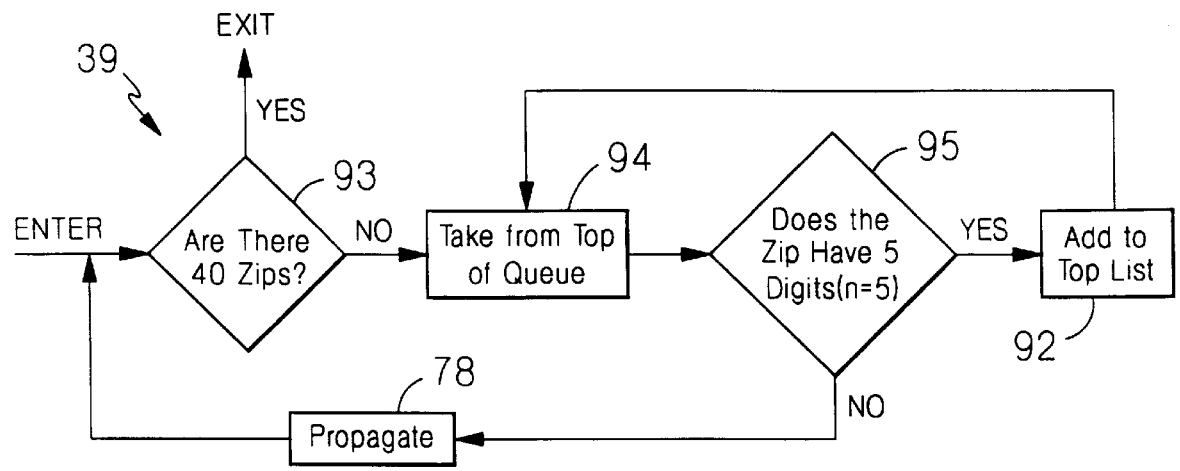
Figure 4C:
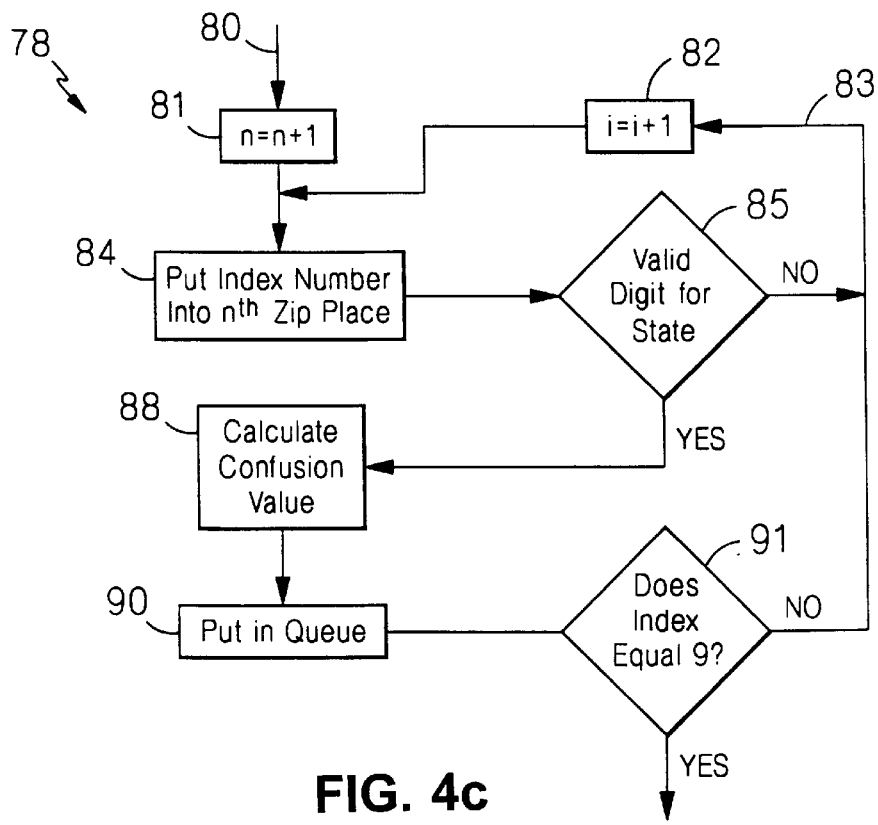

An overview of the code is shown in FIGS. 4A–4C. The user utters the zipstate and city 70. The zipstate is continuously recognized and if the recognized zipstate 38 does not contain good data, i.e., five digits and a state, it is rejected as a bad address 72 and the user is informed that the address was rejected.

If the recognized zipstate contains good data 74, the confusability algorithm 39 is employed to create zipstate list 62. Referring to FIGS. 4B and 4C, a propagation subroutine 78 is entered to hypothesize the zip codes which are to populate zipstate list 62.

As seen in FIG. 4C, in the propagation routine 78, a variable n corresponding to the digit place in the zip code (first, second, third, fourth, or fifth number of the zip code) is incremented 81 each time the propagate routine is entered at arrow 80. An index number i corresponding to the numbers zero through nine is incremented 82 after each loop 83 of the propagation routine. At the start of each loop 84, the index number is put into the nth digit place. The built code is checked for validity 85 against the database of valid zip codes for the recognized state. If the index number in the nth digit place is not valid, the index number is incremented and the next number is tried. If the index number in the nth digit place is valid, a confusion value 88 corresponding to how likely it would be for the recognizer to confuse the number it recognized in the nth digit place with the index number in that digit place is calculated (described further below). The code is placed in a queue 90 and the loop is repeated incrementing the index number each time until i=9 has been checked 91 for the nth digit place. The codes are placed in queue 90 in descending order of probability.

When i=9, the propagation routine is exited. In FIG. 4B, if there are less than forty zip codes 93 in a top list 92, the highest probability code 94 in queue 90 is considered. If code 94 has less than five digits 95, the propagation routine is reentered with this code. Variable n is incremented and the process is repeated until there are 5 digits in the highest probability code. This zip code is then moved to the top list 92. The next highest probability code 94 is then taken from queue 90 for consideration. If there are five digits in this zip code, the zip code is moved to the top list. This is repeated until the code at the top of queue 90 has less than five digits. This partial zip code is then propagated. The confusability algorithm is repeated until there are forty zip codes in top list 92.

Referring again to FIG. 4A, the list of zipstates 62 corresponds to the forty zip codes from top list 92 combined with the recognized state. The zipstates 62 are then rerecognized by a discrete recognition 95' against the original utterance. The recognizer returns a distance parameter of how well the zipstates were recognized 96. Beyond a limit the zipstates are rejected. At most the top ten recognized zipstates form the ranked list of zipstates 64. A database of cities corresponding to zip codes is then consulted to create the list of hypothesized cities 40.

At this point in the code (though the following check could be done at any time after recognizing the original zipstate utterance) the recognized zip code is checked against the recognized state. If the recognized zip code is a valid zip code for the recognized state 97, and if there is only one shipping destination for the recognized state 98, the package is shipped to the recognized state. If either the recognized zip code is not valid for the recognized state or there is more than one shipping destination for the recognized state, the city is recognized 41 by discrete recognition forming the list of cities 42. From the list of cities 42 and the hypothesized cities 40, the ranked list of cities 47 is created as described above with reference to FIG. 2. The algorithm proceeds as described above.

Referring to FIG. 5, the confusion value corresponding to how likely it would be for the recognizer to confuse the recognized number in the nth digit place with the index number in the nth digit place is calculated from a confusability matrix of probabilities. The rows of the matrix correspond to the recognized number and the columns of the matrix correspond to the index number. For example, the probability of confusing the recognized number 4 with the index number 2 is 0.0216. As the number of digit places increases, the probability is calculated by multiplying the probabilities for each digit place. For example, the probability of confusing the recognized number 44 with 22 is 0.0216×0.0216=0.00047; the probability of confusing 442 with 223 is 0.00047×0.1888.

The confusability matrix is experimentally determined by having predetermined numbers read off to the speech recognizer and calculating how often the number is incorrectly recognized and what number it is incorrectly recognized as. The confusability matrix may be customized for an individual user. The confusability matrix is shown in FIG. 5 as a matrix of probabilities for ease of description; the code utilizes a matrix of natural logs of the probability.

EXAMPLE

Utterance: 02143Massachusetts Somerville
Zipstate recognized: 03112MA
Confusability algorithm:

Referring to FIG. 6 in which the calculation of the confusion values is shown for each digit place, in the first digit place, n=1, 0 is the only valid number for Massachusetts zip codes. Queue 90 becomes:

| n | i | zip code | confusion value |
|---|---|----------|-----------------|
| 1 | 0 | 0- - - - | 1 |

There are fewer than 40 zip codes in top list 92; 0—is pulled from queue 90 as the highest probability code in the queue; there are less than five digits in the pulled code; the propagation routine is reentered.

In the second digit place, n=2, 1 and 2 are the only valid digits. Queue 90 becomes:

| n | i | zip code | confusion value |
|---|---|----------|-----------------|
| 2 | 2 | 02- - - | 0.0497 |
| 2 | 1 | 01- - - | 0.0001 |

02—is pulled from queue 90 as the highest probability code and the propagation routine is reentered.

In the third digit place, n=3, 0 to 7 are valid digits. Queue 90 becomes:

| n | i | zip code | confusion value |
|---|---|----------|-----------------|
| 3 | 1 | 021- - | 0.04970 |
| 3 | 4 | 024- - | 0.00456 |
| 3 | 5 | 025- - | 0.00365 |
| 3 | 7 | 027- - | 0.00209 |
| 3 | 0 | 020- - | 0.00077 |
| 2 | 1 | 01- - - | 0.00010 |

For i=2, 3 and 6 the confusion value is 0.0497 * 0.0001, which is so low that these codes get dropped from the queue.

021—is pulled from queue 90 as the highest probability code and the propagation routine is reentered.

In the forth digit place, n=4, 0 to 9 are valid digits. Queue 90 becomes:

| n | i | zip code | confusion value |
|---|---|----------|-----------------|
| 4 | 1 | 0211- | 0.04970 |
| 4 | 4 | 0214- | 0.00456 |
| 3 | 4 | 024- - | 0.00456 |
| 4 | 5 | 0215- | 0.00365 |
| 3 | 5 | 025- - | 0.00365 |
| 4 | 7 | 0217- | 0.00209 |
| 3 | 7 | 027- - | 0.00209 |
| 4 | 9 | 0219- | 0.00150 |
| 4 | 0 | 0210- | 0.00077 |
| 3 | 0 | 020- - | 0.00077 |
| 2 | 1 | 01- - - | 0.00010 |

0211—is pulled from queue 90 as the highest probability code and the propagation routine is reentered.

In the fifth digit place, n=5, 0 to 9 are valid digits. Queue 90 becomes:

| n | i | zip code | confusion value |
|---|---|----------|-----------------|
| 5 | 2 | 02112 | 0.04970 |
| 5 | 3 | 02113 | 0.00940 |
| 5 | 6 | 02116 | 0.00600 |
| 4 | 4 | 0214- | 0.00456 |
| 3 | 4 | 024- - | 0.00456 |
| 5 | 0 | 02110 | 0.00365 |
| 4 | 5 | 0215- | 0.00365 |
| 3 | 5 | 025- - | 0.00365 |
| 5 | 7 | 02117 | 0.00260 |
| 5 | 8 | 02118 | 0.00209 |
| 4 | 7 | 0217- | 0.00209 |
| 3 | 7 | 027- - | 0.00209 |
| 5 | 4 | 02114 | 0.00200 |
| 5 | 9 | 02119 | 0.00150 |
| 4 | 9 | 0219- | 0.00150 |
| 5 | 5 | 02115 | 0.00140 |
| 5 | 1 | 02111 | 0.00100 |
| 4 | 0 | 0210- | 0.00077 |
| 3 | 0 | 020- - | 0.00077 |
| 2 | 1 | 01- - - | 0.00010 |

There are fewer than 40 zip codes in top list 92; 02112 is pulled from queue 90 as the highest probability code; 02112 has five digits so it is moved to top list 92; 02113 is pulled from queue 90 and moved to the top list; 02116 is pulled from queue 90 and moved to the top list; 0214—is pulled from queue 90 and propagated.

Again, in the fifth digit place, n=5, 0 to 9 are valid digits. Queue 90 becomes:

| n | i | zip code | confusion value |
|---|---|----------|-----------------|
| 5 | 2 | 02142 | 0.00456 |
| 3 | 4 | 024- - | 0.00456 |
| 5 | 0 | 02110 | 0.00365 |
| 4 | 5 | 0215- | 0.00365 |
| 3 | 5 | 025- - | 0.00365 |
| 5 | 7 | 02117 | 0.00260 |
| 5 | 8 | 02118 | 0.00209 |
| 4 | 7 | 0217- | 0.00209 |
| 3 | 7 | 027- - | 0.00209 |
| 5 | 4 | 02114 | 0.00200 |
| 5 | 9 | 02119 | 0.00150 |
| 4 | 9 | 0219 | 0.00150 |
| 5 | 5 | 02115 | 0.00140 |
| 5 | i | 02111 | 0.00100 |
| 5 | 3 | 02143 | 0.00086 |
| 4 | 0 | 0210- | 0.00077 |
| 3 | 0 | 020- - | 0.00077 |
| 5 | 6 | 02146 | 0.00055 |
| 5 | 0 | 02140 | 0.00033 |
| 5 | 7 | 02147 | 0.00020 |
| 5 | 8 | 02148 | 0.00019 |
| 5 | 4 | 02144 | 0.00018 |
| 5 | 9 | 02149 | 0.00014 |
| 5 | 5 | 02145 | 0.00013 |
| 2 | 1 | 01- - - | 0.00010 |

02142 is moved to the top list and 024—is pulled from queue 90 and propagated. The process is continued until there are forty zip codes in top list 92. The top 30 zip codes are shown in FIG. 7.

Discrete recognition of the top forty zipstates yields four zipstates in ranked order, corresponding cities 40 are hypothesized:

| zipstates | hypothesized cities 40 |
|-----------|------------------------|
| 02143MA | Somerville |
| 02147MA | Brookline Village |
| 02112MA | Essex Station |
| 02113MA | Hanover |

Cities 42 are discretely recognized from the utterance:

> Sagamore
> Somerville
> Sudbury
> Salisbury
> Sheldonville

City list 44 is formed:

> Somerville
> Brookline Village
> Essex Station
> Hanover
> Sudbury
> Sagamore
> Salisbury
> Sheldonville Ranked city list 47 is formed from discrete rerecognition of the city:

> Sagamore
> Somerville
> Sudbury
> Salisbury
> Sheldonville

Comparison of hypothesized cities 40 to ranked list 47 shows Somerville as the common city. The package is shipped to Somerville.

Factory tests of the invention for sorting packages have resulted in a package rejection rate for invalid address of about 2% and a misshipping rate of about 0.1%; whereas, factory tests of the invention without employing the confusability algorithm, i.e., hypothesizing cities only from the one recognized zipstate, resulted in a package rejection rate of about 5–8% and a misshipping rate of about 0.1%.

Figure 8:
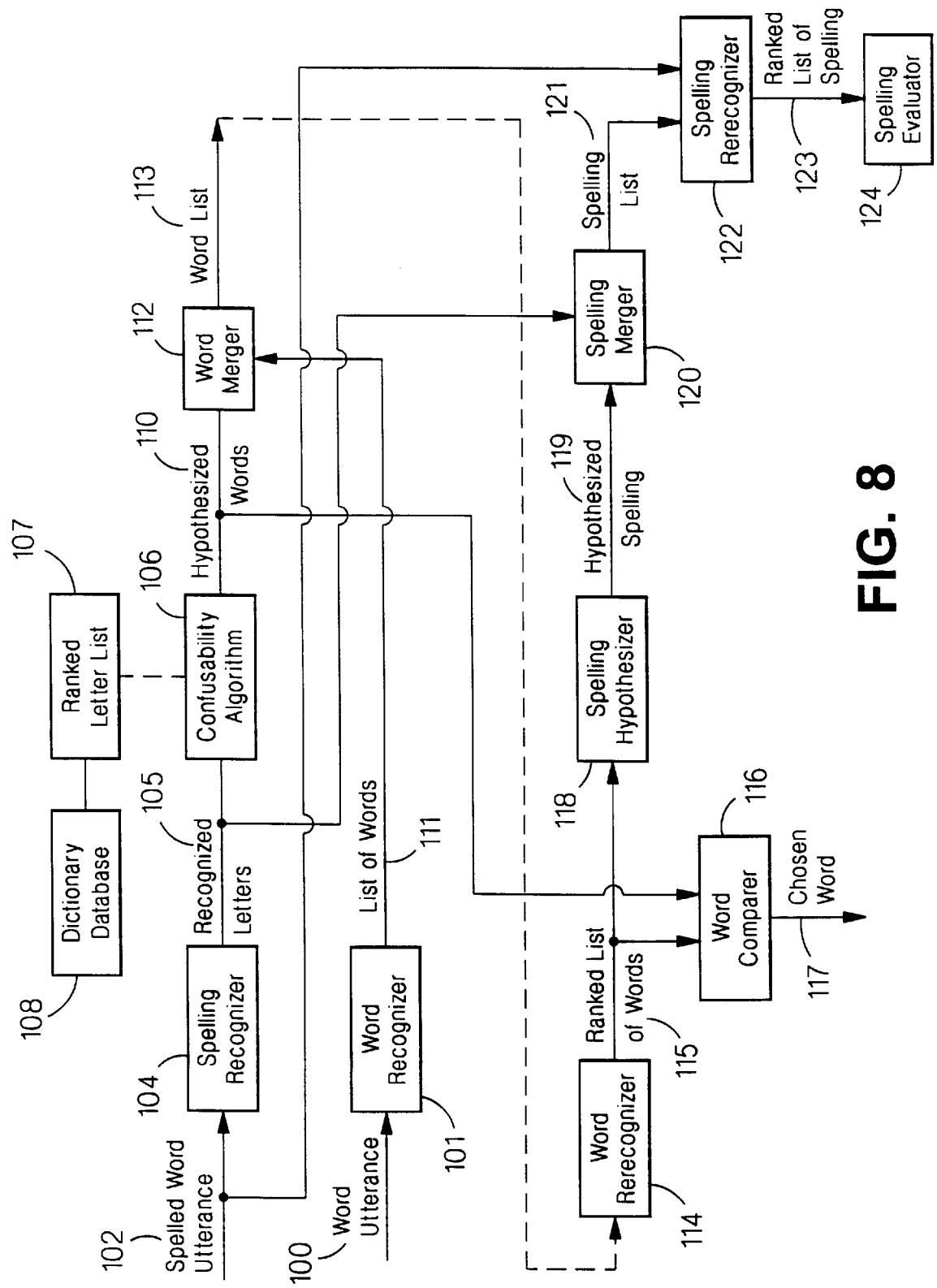
FIG. 8 is a functional block diagram of a system for determining a word from the spelling of the word.

Referring to FIG. 8, a similar hypothesis algorithm can be used to recognize spoken letters when spelling a word. The word 100 is first uttered and recognized 101 by discrete recognition. If the recognizer gets the word wrong, the user so indicates to the recognizer and then utters the spelling of the word 102. The spoken string of letters is recognized 104 by continuous recognition. The confusability algorithm 106 uses the probability that a recognized letter 105 would be confused with a letter of the alphabet. As in the zip code example, a ranked list of letter combinations 107 is formed (similar to ranked zipstate list 64). In creating the ranked list of letter combinations, a dictionary database 108 is consulted to validate that each letter combination is capable of forming a valid word (similar to checking for valid zip codes). The top forty valid letter combinations are then discretely rerecognized against the spoken string of letters to form ranked list 107. A list of words 110 is then hypothesized from the ranked list of letter combinations (similar to hypothesized cities 40).

The hypothesized words 110 and a list of words 111 formed by discrete recognition of the uttered word 100 are merged 112 to form a word list 113. Word list 113 is discretely rerecognized 114 against the spoken word and a ranked list of words 115 is formed. Ranked list of words 115 is compared 116 to hypothesized words 110, the top ranked word being compared first. The first ranked word that shows up in the hypothesized words 110 is chosen 117.

If the chosen word is incorrect the user can reject it and the next ranked word that shows up in the hypothesized words 110 is chosen. This process can be continued until the correct word is chosen or the ranked list is exhausted. Alternatively, word comparer 116 can create a choice list 117' containing all words in common between ranked list of words 115 and hypothesized words 110 can be displayed to the user. If the correct word is contained within the choice list, the user can select the word either using the keyboard or with a spoken command. For example, if the misrecognized uttered word 100 is "in", a choice list may appear as:

> in
> an
> ink
> imp
> and
> amp with the first ranked word appearing above the list and within the list. If the user then continues speaking without choosing from the choice list, the first ranked word is automatically chosen.

If the ranked list is exhausted without finding a common word or the correct word, possible spellings 119 are hypothesized 118 from the ranked list of words 115. The recognized spelling 104 is merged 120 with the hypothesized spellings 119 and the resulting spelling list 121 is discretely rerecognized 122 against the original spelling utterance 102 to form a ranked list of spellings 123. The second spelling on the ranked list is evaluated 124. If the distance parameter returned by the recognizer is beyond the acceptable limit, the spelling is rejected, if it is within the acceptable limit, that word is chosen. If the user rejects the spelling, the next spelling on the list can be considered. Alternatively, as described above, a choice list 123' containing all but the first ranked spelling in the ranked list of spellings 123 can be displayed to the user for selection.

Figure 10:
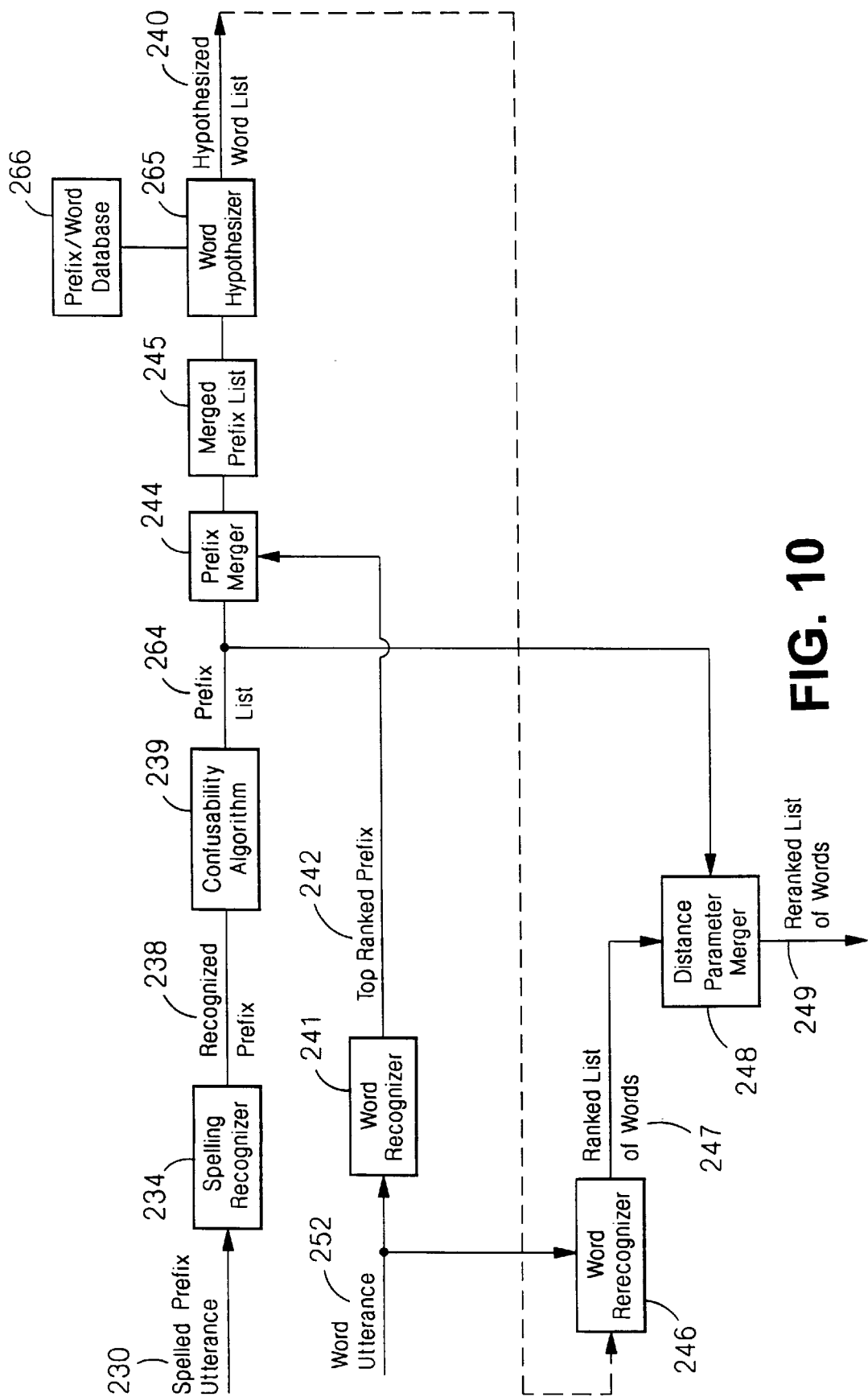
FIG. 10 is a functional block diagram of a system for determining a word from the spelling of the word.

Referring to FIG. 10, a particular embodiment of a hypothesis algorithm for recognizing spelled word prefixes is shown. Symbols which may be included in the prefix are generally letters, numbers, and punctuation (e.g., hyphen, period, comma, brackets). The word 232 is first uttered and recognized 241 by discrete recognition. If word 232 is incorrectly recognized, the user utters the spelling of the prefix of the word 230 (generally 3 to 5 symbols, the prefix may be part or all of the word). The spelled prefix is recognized 234 by continuous recognition. The confusability algorithm 239 uses the probability that the symbols in recognized prefix 238 would be confused with other symbols to hypothesize a ranked list of prefixes 264. A distance parameter associated with each prefix signifies how poorly each prefix was recognized as compared to the highest ranked prefix. A top ranked prefix 242 determined by discrete recognition of the uttered word 232 is merged 244 with prefix list 264 to form merged prefix list 245. Word hypothesizer 265 hypothesizes a word list 240 by consulting a database of prefixes and corresponding words 266.

Word list 240 is discretely rerecognized 246 against the uttered word 232 to form a ranked list of words 247 including a distance parameter associated with each word signifying how poorly each word was recognized as compared to the highest ranked word. The distance parameters associated with prefixes 264 are then added 248 to the distance parameters of words 247 that include corresponding prefixes and ranked list 247 is reranked 249 according to the new distance parameters. This aids in the recognition of homophones because it gives a higher ranking to the homophone having a higher ranked spelled prefix. Reranked word list 249 is displayed to the user as a choice list. If the correct word is contained within the choice list, the user can select the word either using the keyboard or with a spoken command.

Figure 11:
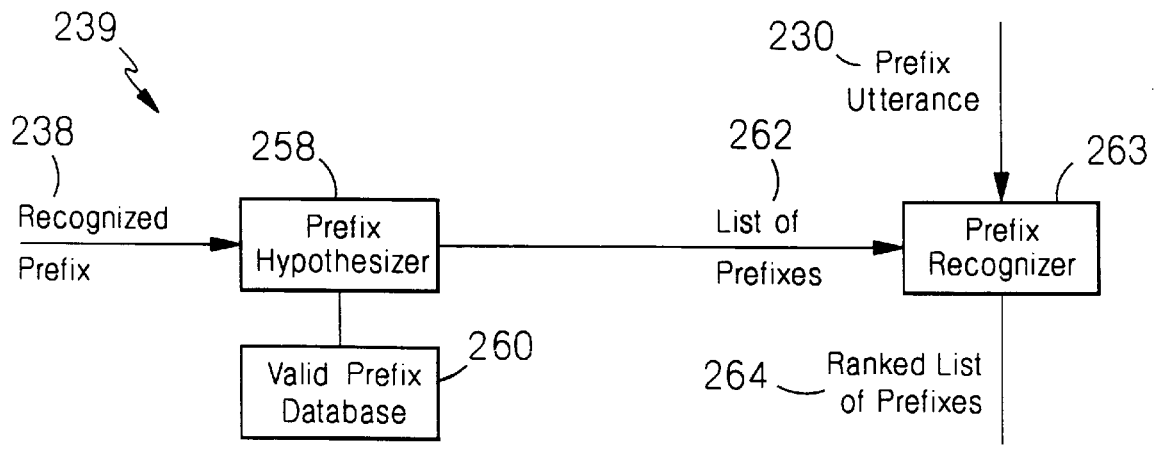
FIG. 11 is a functional block diagram of a confusability algorithm.

As seen in FIG. 11, in the confusability algorithm 239, a prefix hypothesizer 258 hypothesizes a list of prefixes 262 based on the probability that recognizer 234 would confuse recognized prefix 238 with other word prefixes. A database 260 of valid prefixes or words is used as a filter to form a list of valid prefixes 262. Database 260 can be, e.g., a list of valid prefixes, a dictionary, or an n-letter language model. The top one-hundred and fifty prefixes, i.e., those with the highest probabilities of being confused with the recognized prefix 238, form the list of prefixes 262. The list of prefixes 262 are then rerecognized 263 against the uttered prefix 230 in a discrete recognition which filters out poorly confused prefixes and creates a ranked list 264 of the top fifteen to twenty prefixes. It is this ranked list 264 of prefixes that is merged with the top ranked prefix from the discrete recognition of the uttered word to form the merged prefix list 245 from which the list of hypothesized words 240 is created.

Figure 12A:
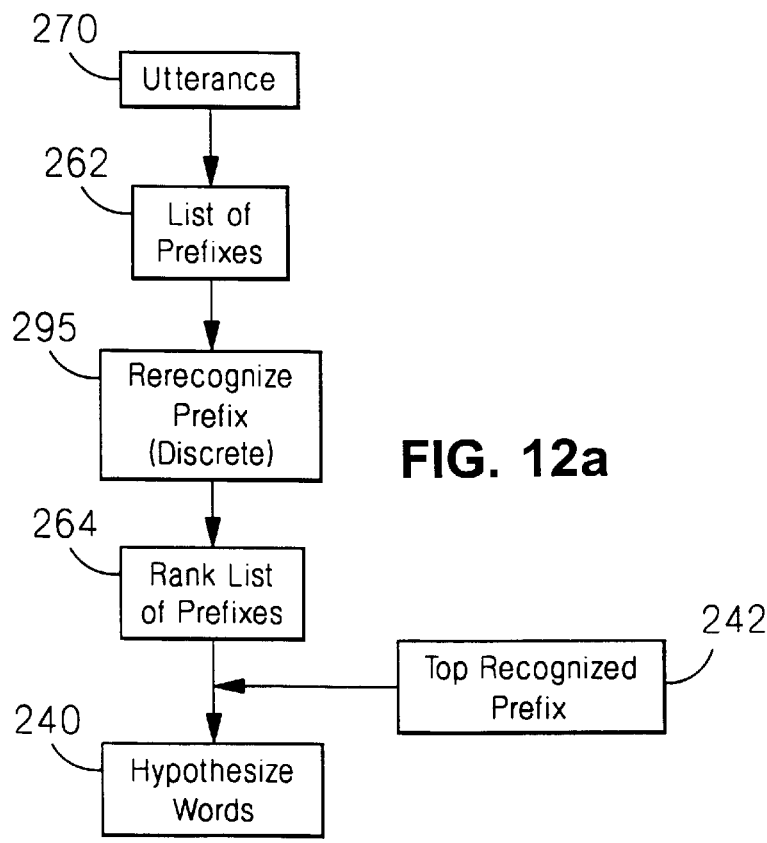
FIGS. 12A–12C are flow diagrams showing an implementation of the word determining system.
Figure 12B:
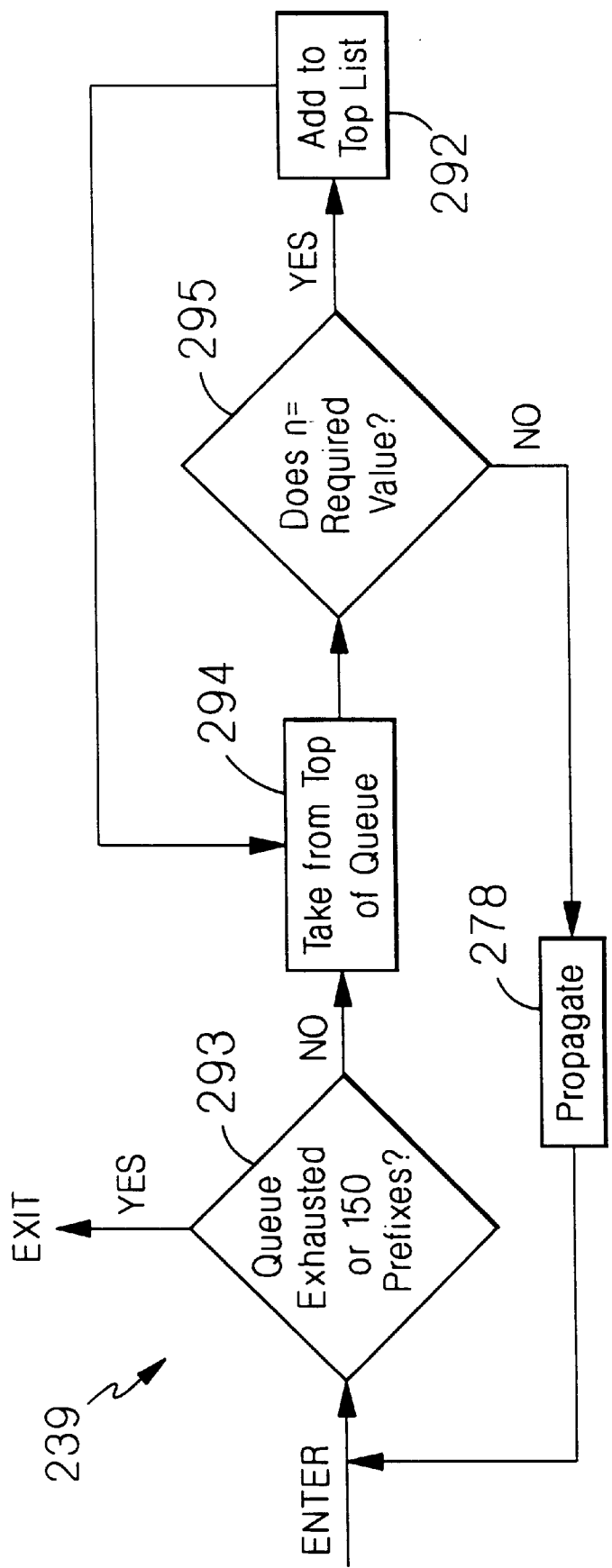
Figure 12C:
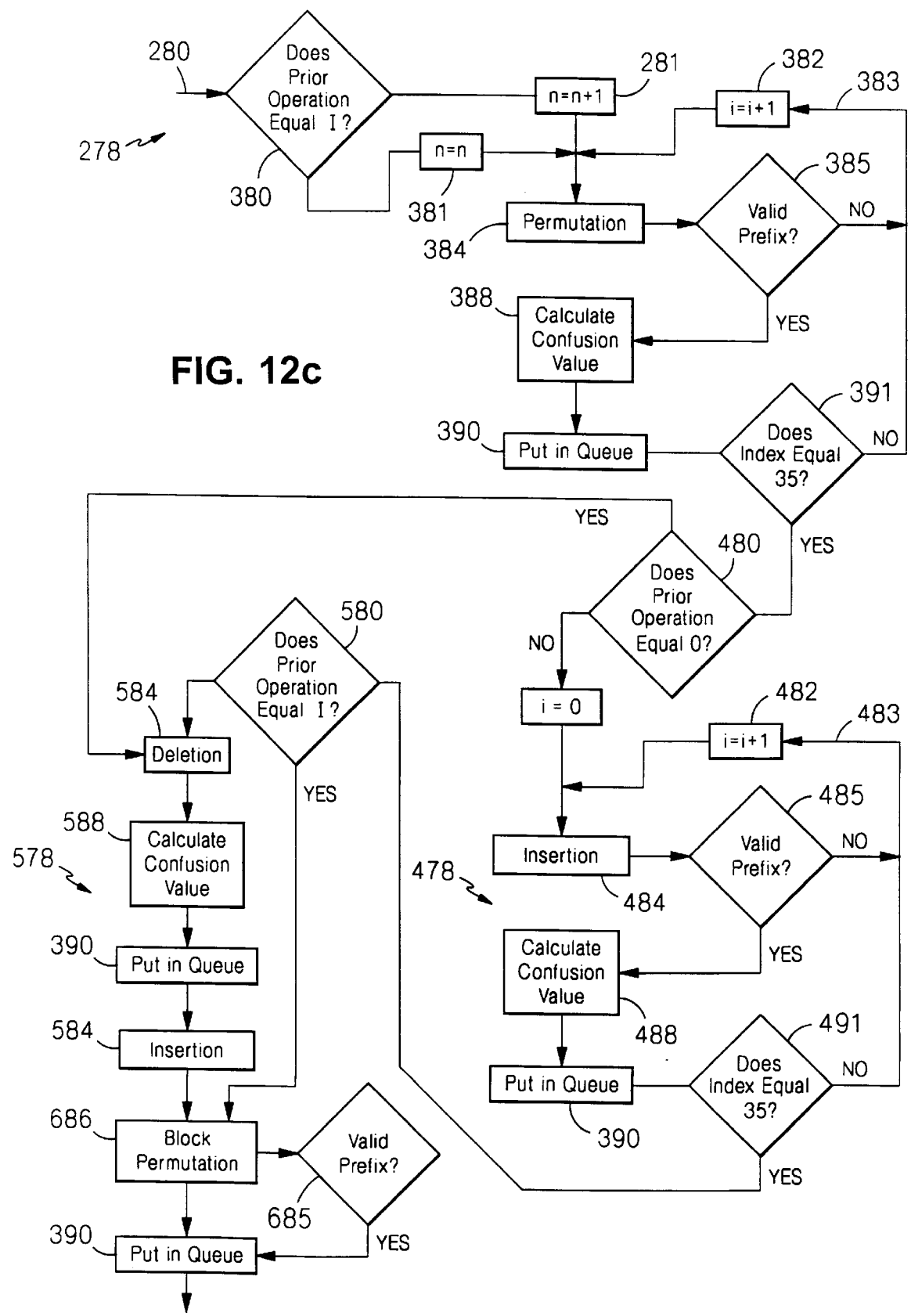

An overview of the code is shown in FIGS. 12A–12C. The user utters a word and if the recognizer misrecognizes the word, the user then utters the prefix 270. The confusability algorithm 239 is then employed to create prefix list 262. Referring to FIGS. 12A and 12C, a propagation sub-routine 278 is entered to hypothesize the prefixes which are to populate prefix list 262.

As seen in FIG. 12C, in the propagation routine 278, a variable n corresponding to the digit place in the prefix (first, second, third, forth, or fifth place in a prefix having five symbols) is incremented 281 each time the propagate routine is entered at arrow 280 (unless the prior propagation was an insertion 380, as described below, in which case n is not incremented 381). Alternatively, variable n can be incrementing at the end of each permutation loop and deletion and kept constant at the end of each insertion loop. Propagation routine 278 includes three sub-routines, a permutation routine 378, an insertion routine 478 and a deletion routine 578. An index value i (i=0 to the number of symbols, i=0 to 35 in the example that follows) corresponding to the symbols letters a through z, digits zero through nine, and punctuation, in that order, is incremented 382, 482 after each loop 383, 483 of the subroutines. As described more fully below, confusability is determined in the context of the preceding symbol in the prefix.

At the start 384 of permutation routine 378, the index value i is put into the nth digit place and checked for validity 385 against the database of valid prefixes 260. If the index value in the nth digit place is not valid, the index value is incremented and the next value is tried. If the index value in the nth digit place is valid, a confusion value 388 corresponding to how likely it would be for the recognizer to confuse the value it recognized in the nth digit place with the index value in that digit place is calculated (described further below). The prefix is placed in a queue 390 and the loop is repeated incrementing the index value each time until i=38 has been checked 391 for the nth digit place. The codes are placed in queue 390 in descending order of probability.

When i=38 in permutation routine 378, if the last loop of propagation routine 278 entered for this build was not a deletion loop 480, insertion routine 478 is entered 484, i is set to zero and put into the nth digit place (insertion loops do not follow deletion loops and deletion loops do not follow insertion loops because to do so would cancel out their effect). The built prefix is checked for block permutation 486 and for validity 485. If the index value in the nth digit place is valid, a confusion value 488 is calculated and the prefix is placed in queue 390. Loop 483 is repeated incrementing the index value each time until i=38 has been checked 491 for the nth digit place.

When i=38 in insertion routine 478, if the last loop of propagation routine 278 entered for this build was not an insertion loop 580, deletion routine 578 is entered 584. A confusion value 588 corresponding to how likely it would be for the recognizer to confuse the value it recognized in the nth digit place with the absence of a symbol in the nth digit place is calculated. The prefix is placed in queue 390.

At the end of the propagation routine, the prefix that the propagation routine is entered with (described more fully below) is checked for inclusion of a block permutation 686. A block permutation occurs if the built prefix includes LU, LE, MU or ME. The letter W is substituted for these letter combinations and checked for validity 685 against the database of valid prefixes 260. If it is a valid prefix it is placed in queue 390.

Propagation routine 278 is then exited. Referring to FIG. 12a, the highest probability prefix 294 in queue 390 is considered. If the value of n from the prior propagation of prefix 294 is less than the number of symbols in recognized prefix 238, the propagation routine is reentered with this prefix. If the last build for this prefix was not an insertion, variable n is incremented and the propagation routine reentered. If the last build for this prefix was an insertion, the propagation routine is reentered without incremented variable n. The process is repeated until the value of n of the highest probability prefix in queue 390 is equal to the number of symbols in recognized prefix 238. This prefix is then moved to the top list 292. The next highest probability prefix 294 is then taken from queue 390 for consideration. The confusability algorithm is repeated until queue 390 is exhausted or there are one-hundred and fifty prefixes 293 in top list 292.

Referring again to FIG. 12A, the list of prefixes 262 corresponds to the one-hundred and fifty prefixes from top list 292. The prefixes 262 are then rerecognized by a discrete recognition 295 against the original prefix utterance 230. The recognizer returns a distance parameter with each prefix related to how well the prefixes were recognized. At most the top fifteen to twenty recognized prefixes form the ranked list of prefixes 264. The top prefix 242 from discrete recognition 241 of uttered word 232 is combined with prefix list 264. A database of words corresponding to prefixes is then consulted to create the list of hypothesized words 240. The ranked list of words 247 is created as described above with reference to FIG. 10. The algorithm proceeds as described above.

Figure 13A-2:
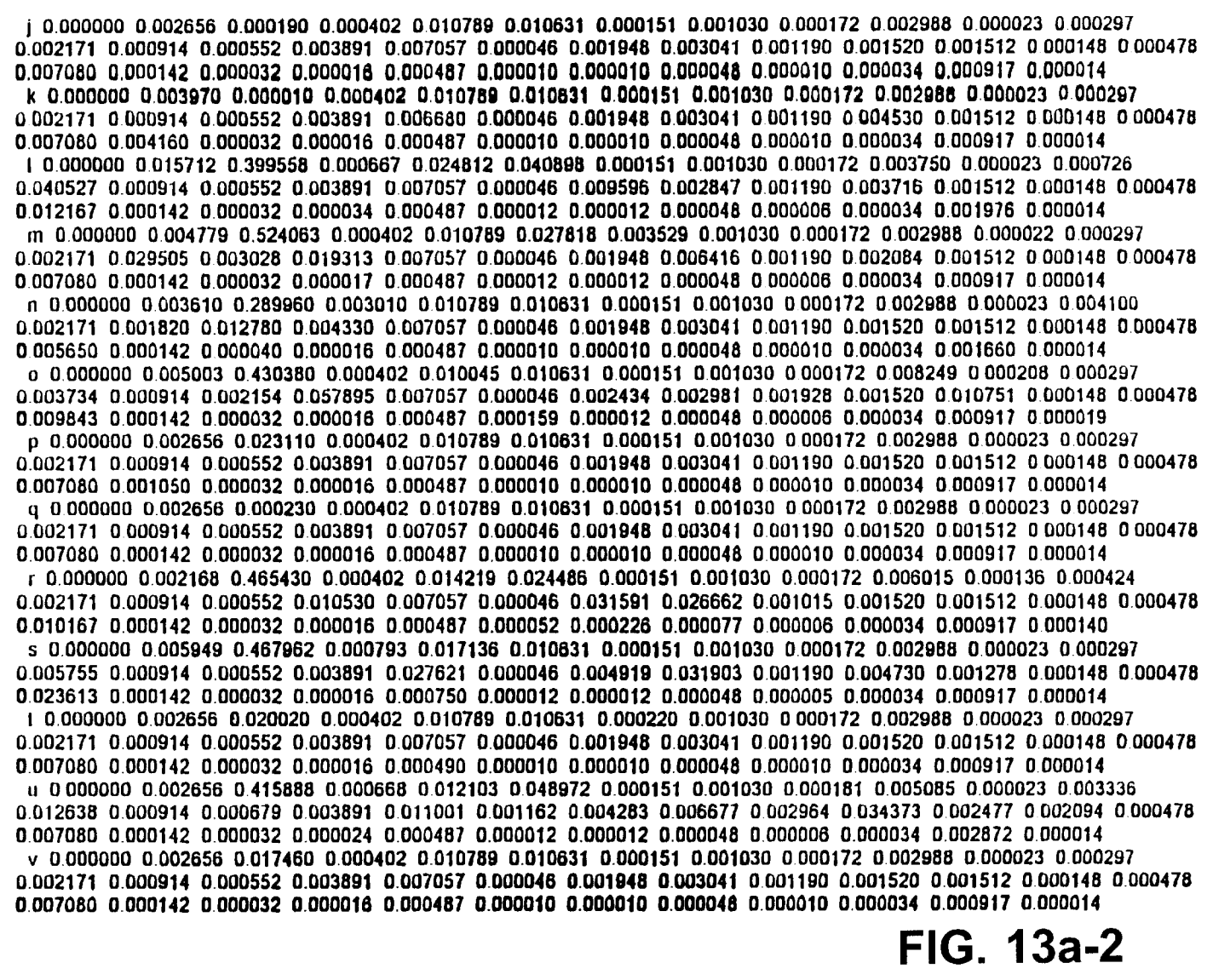
Figure 13A-4:
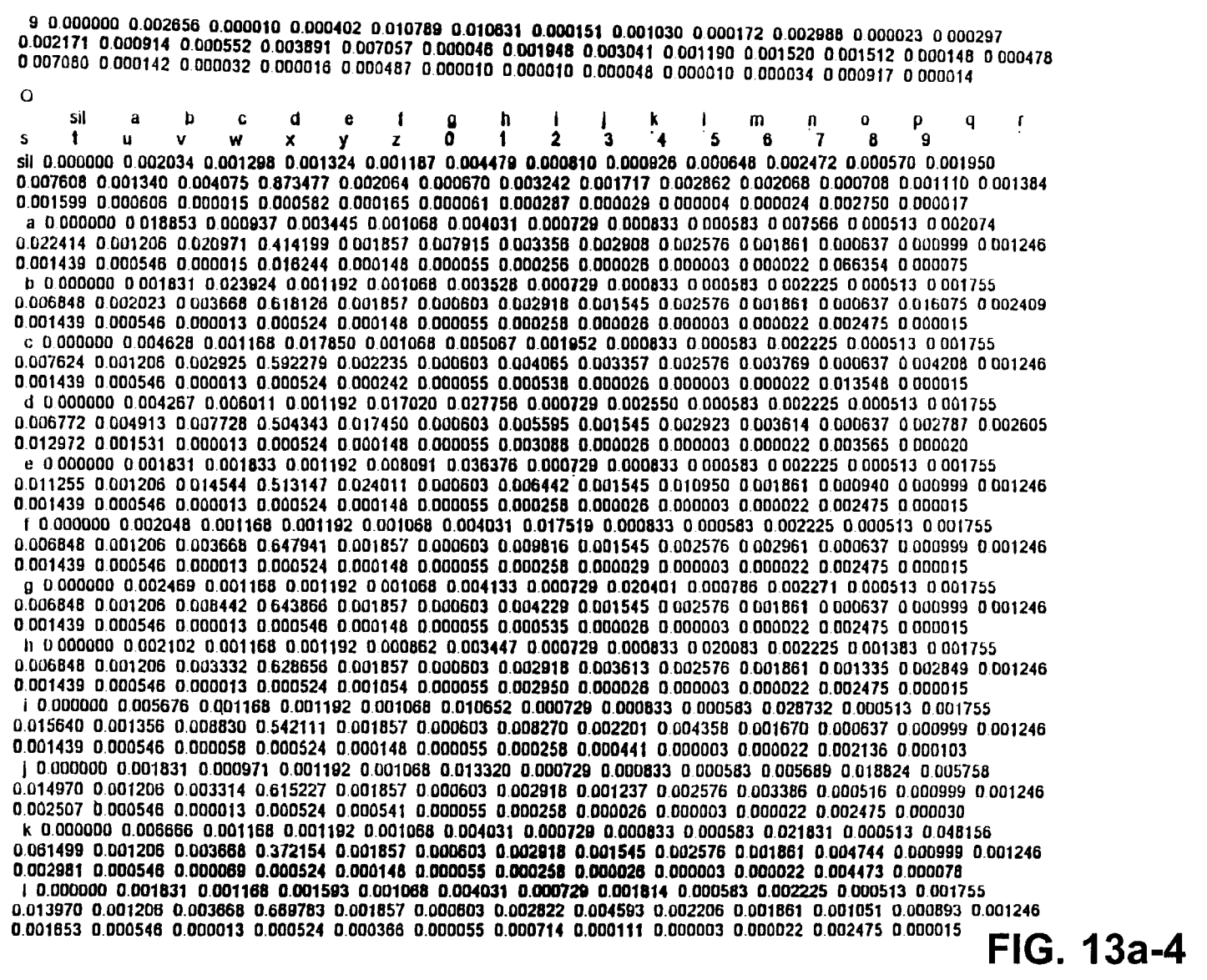
Figure 13A-5:
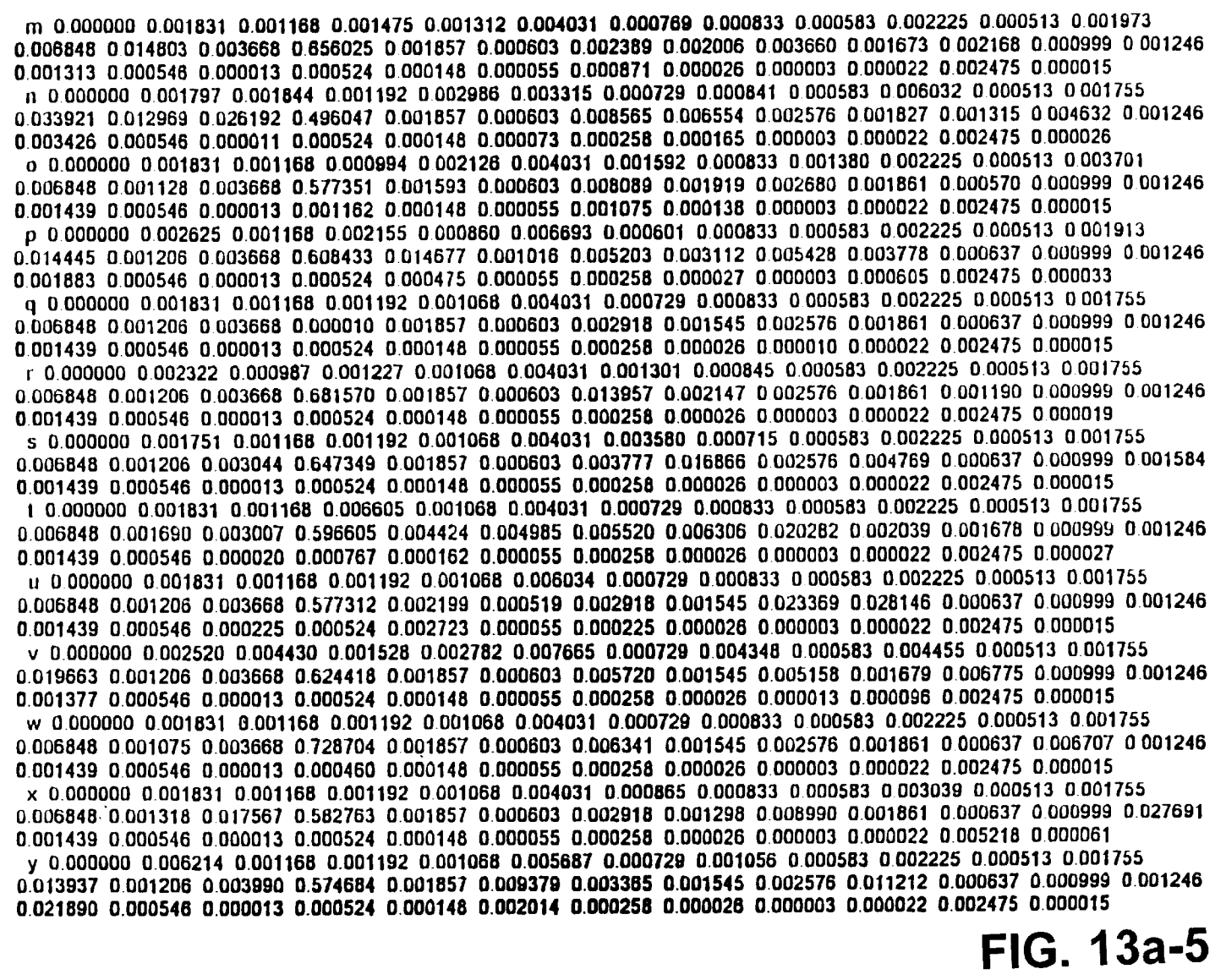
Figure 13A-6:
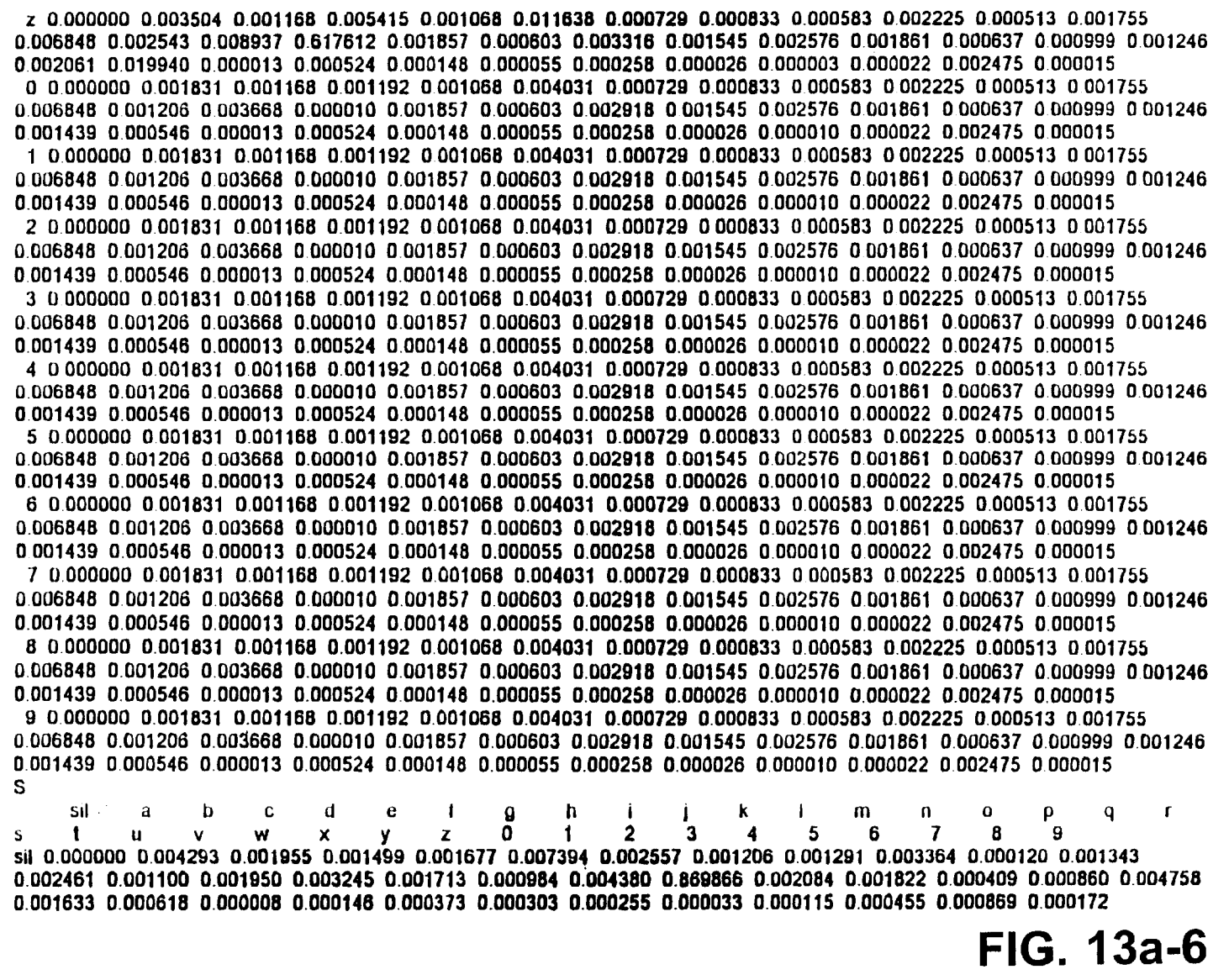
Figure 13A-7:
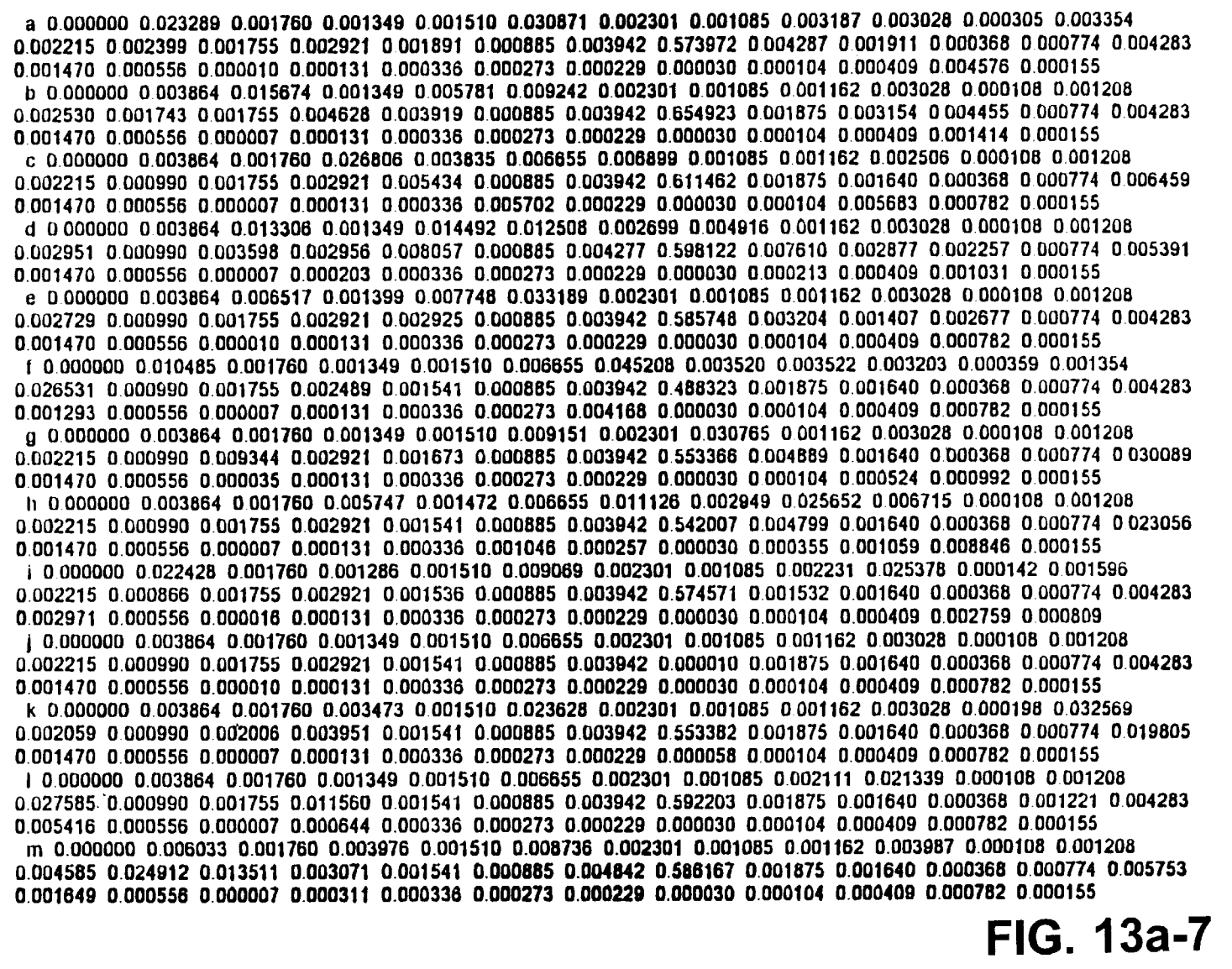
Figure 13A-8:
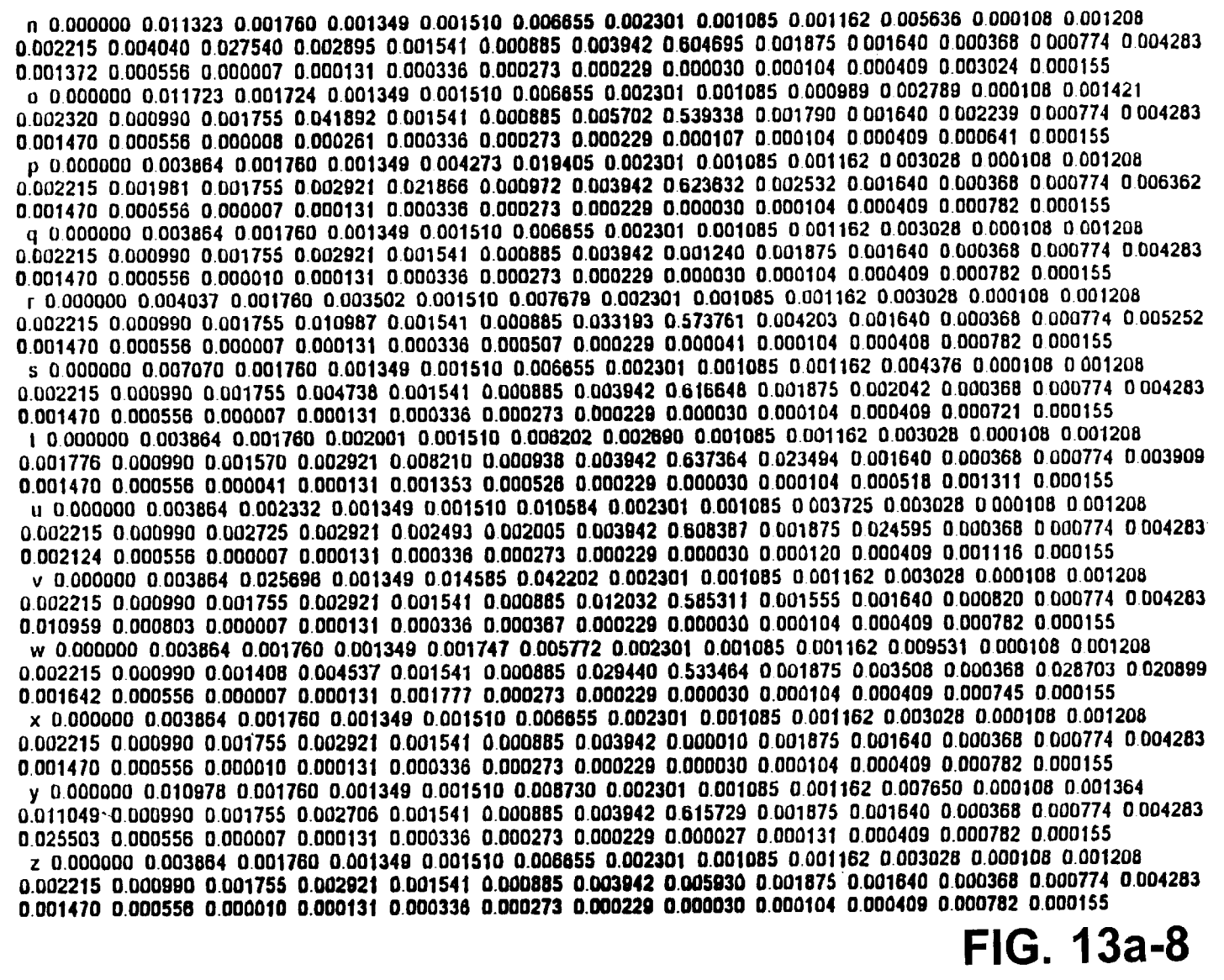
Figure 13A-9:
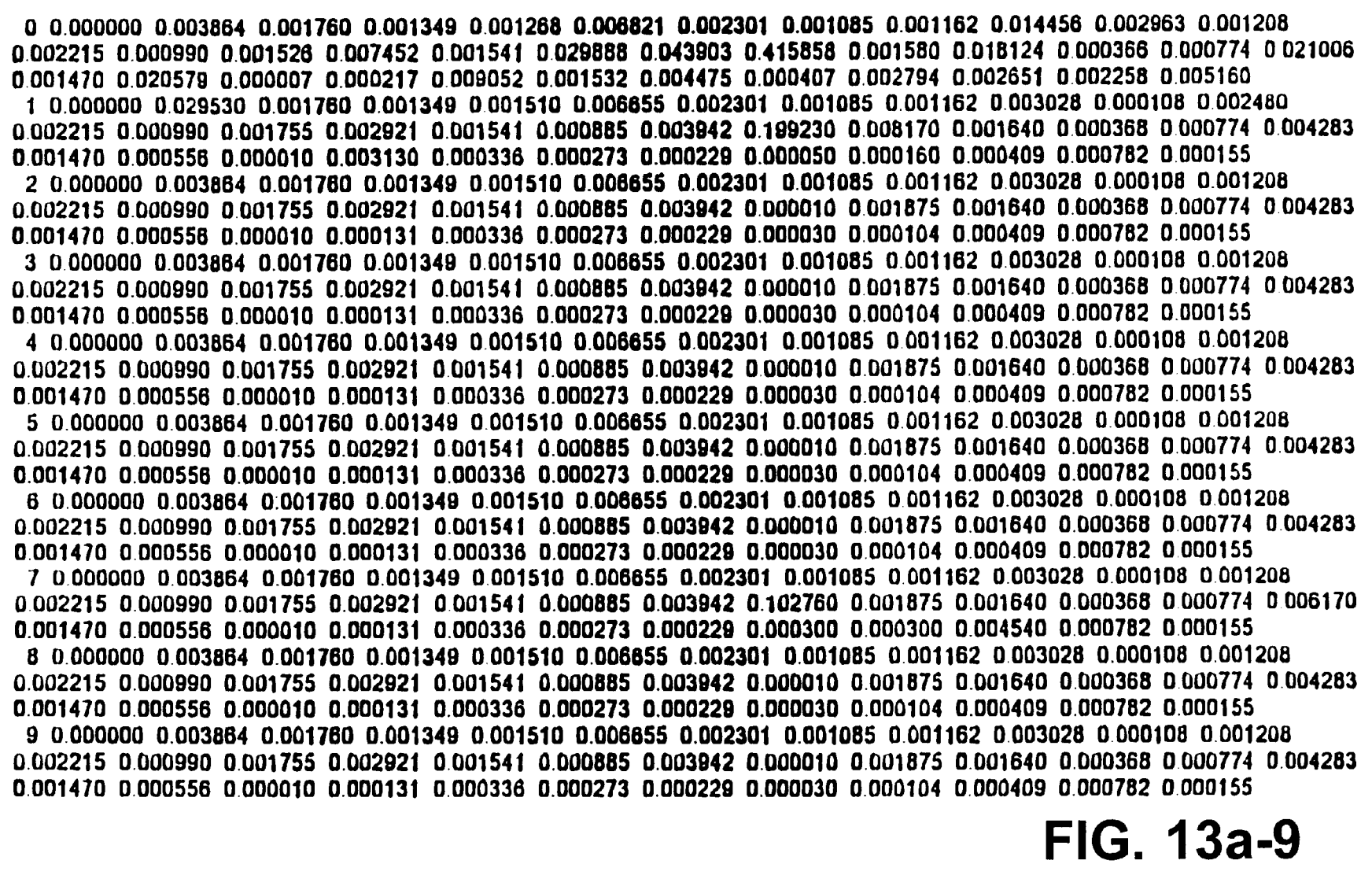
Figure 13B-1:
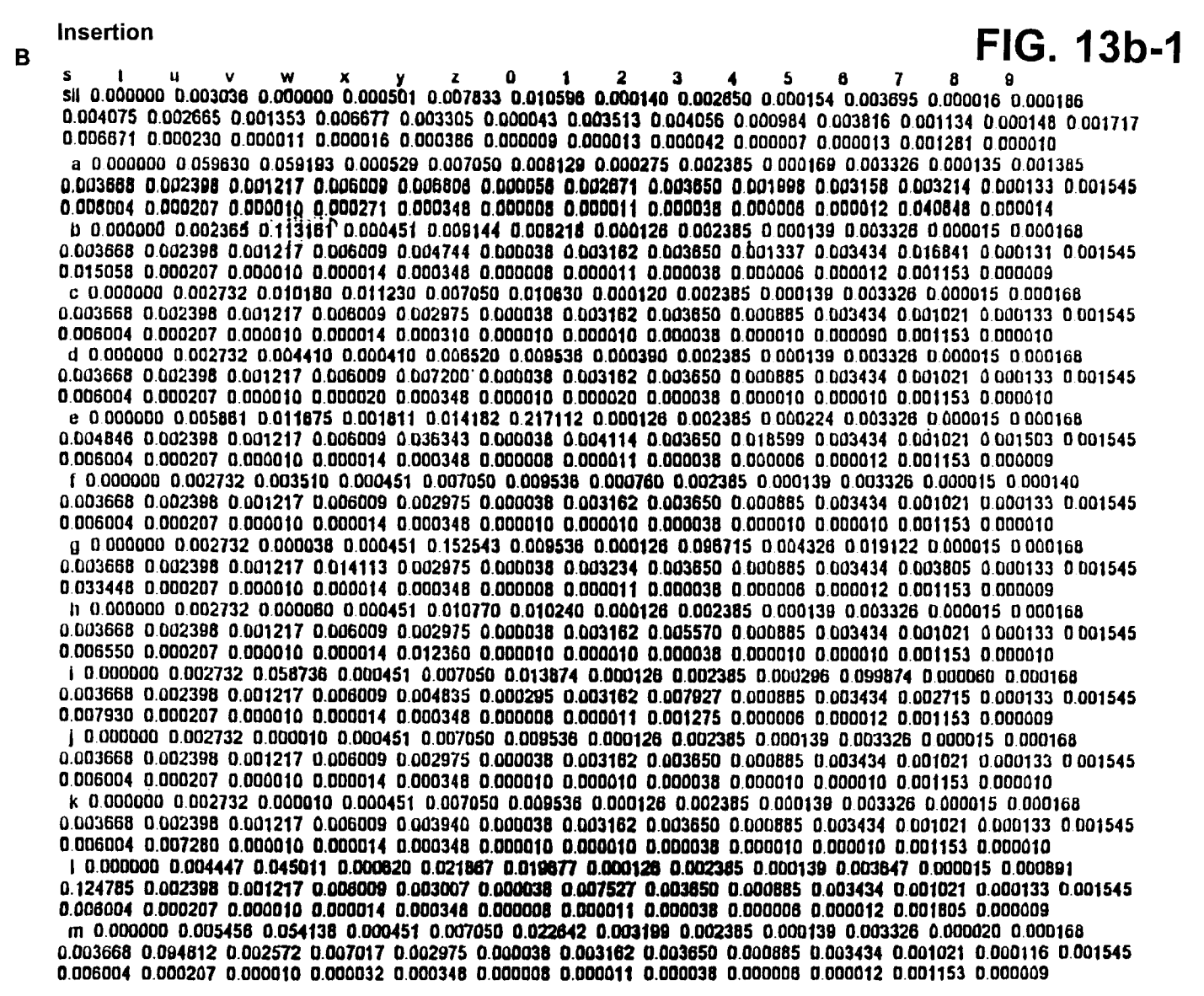
Figure 13B-2:
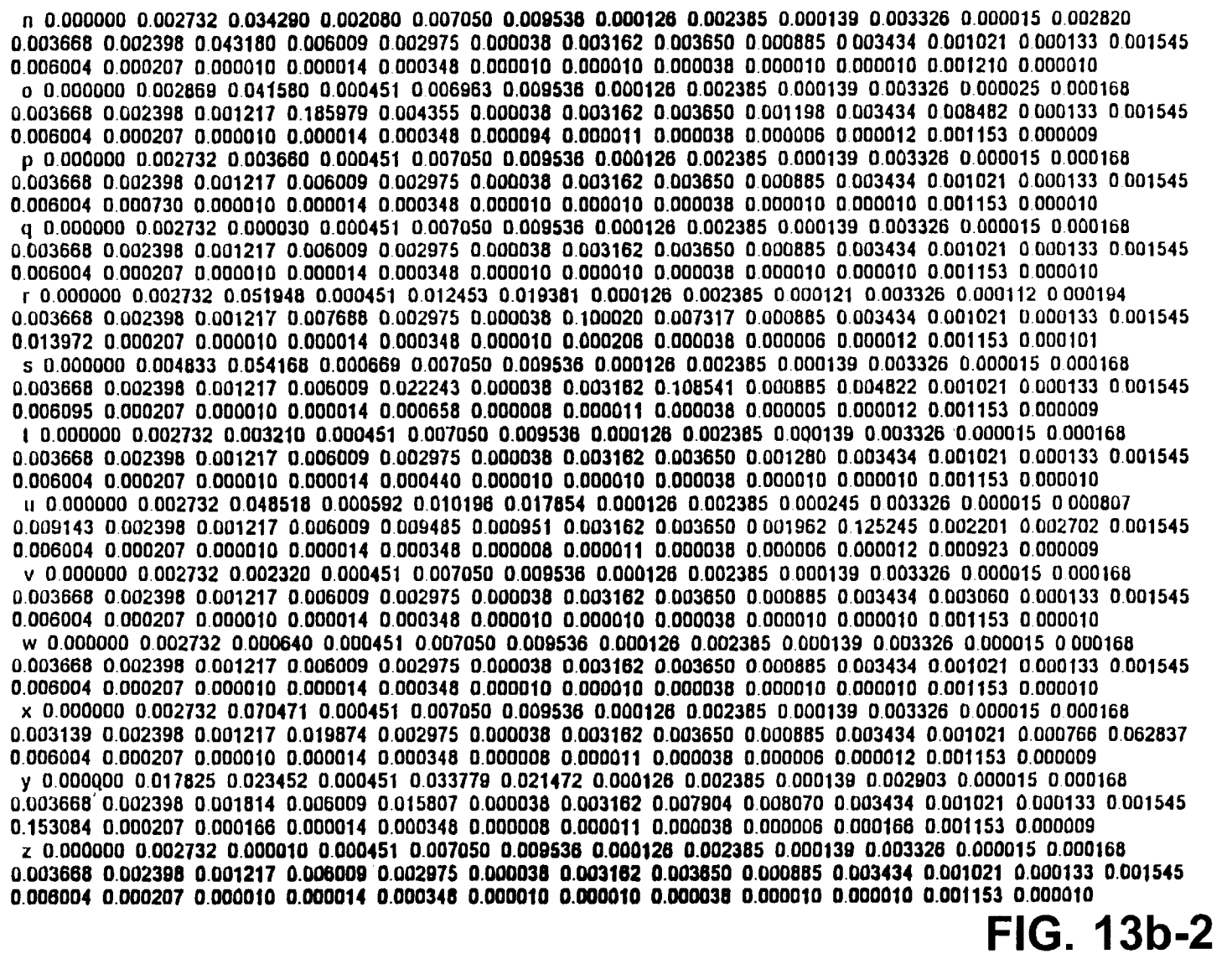
Figure 13B-3:
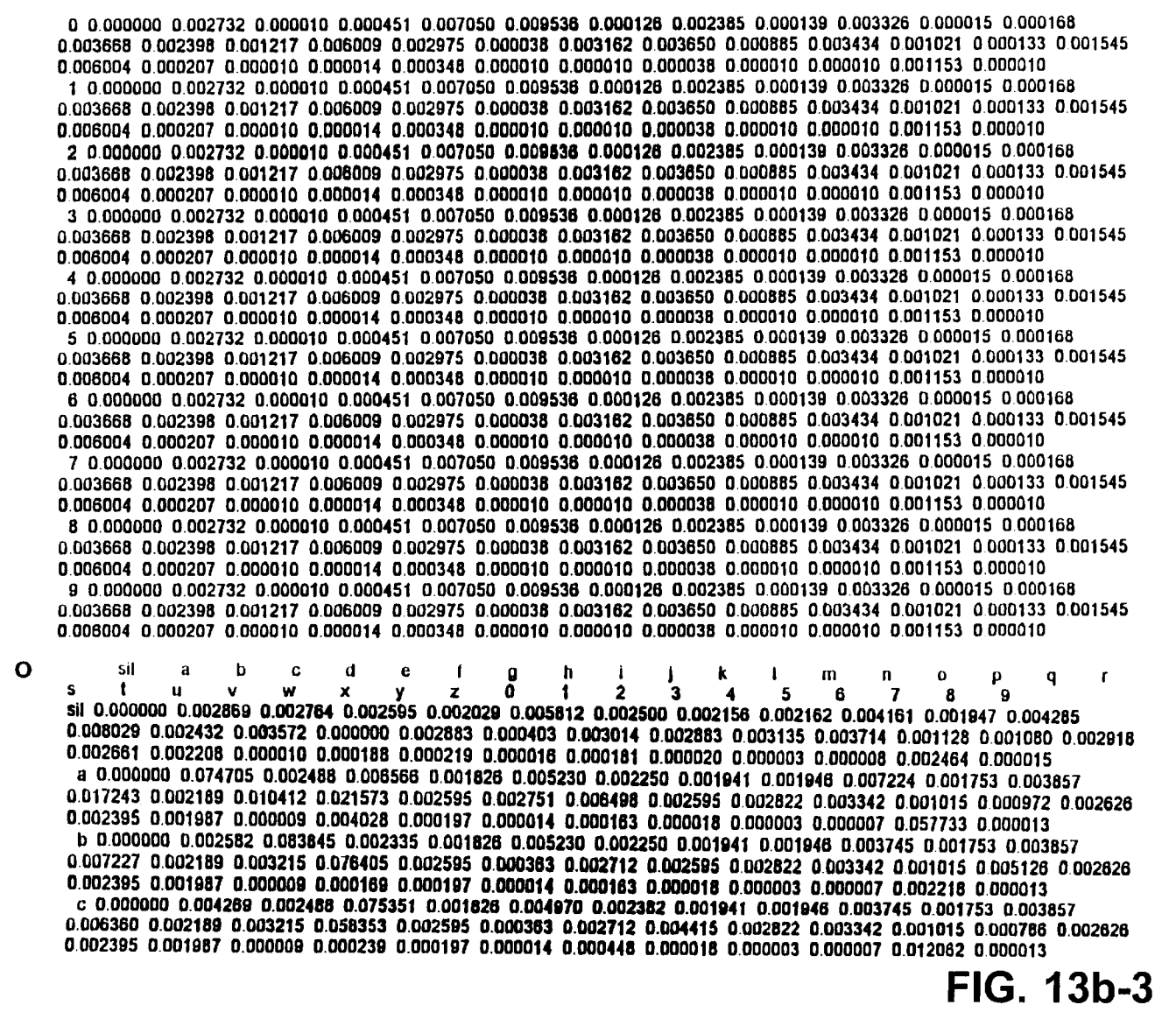
Figure 13B-4:
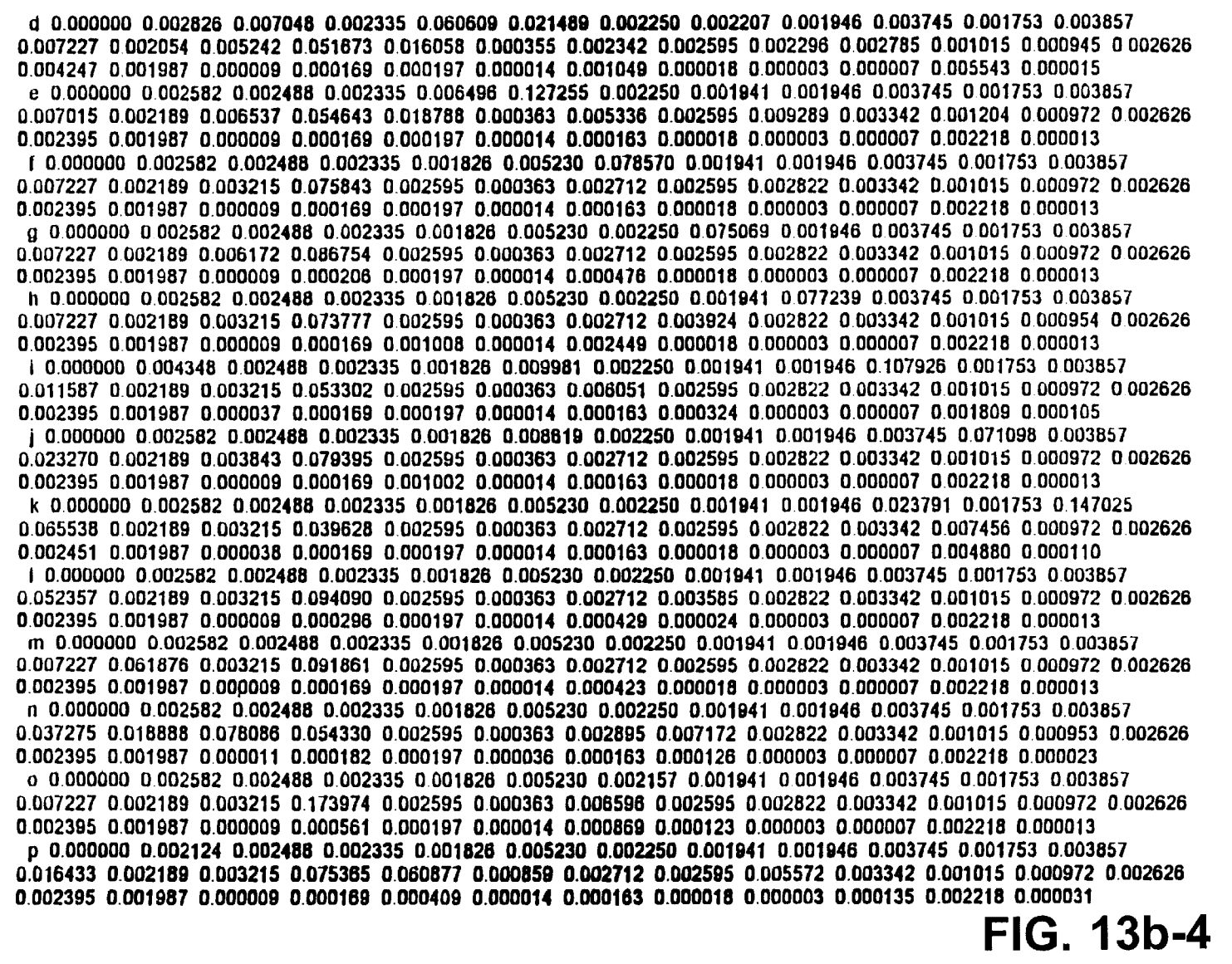
Figure 13B-5:
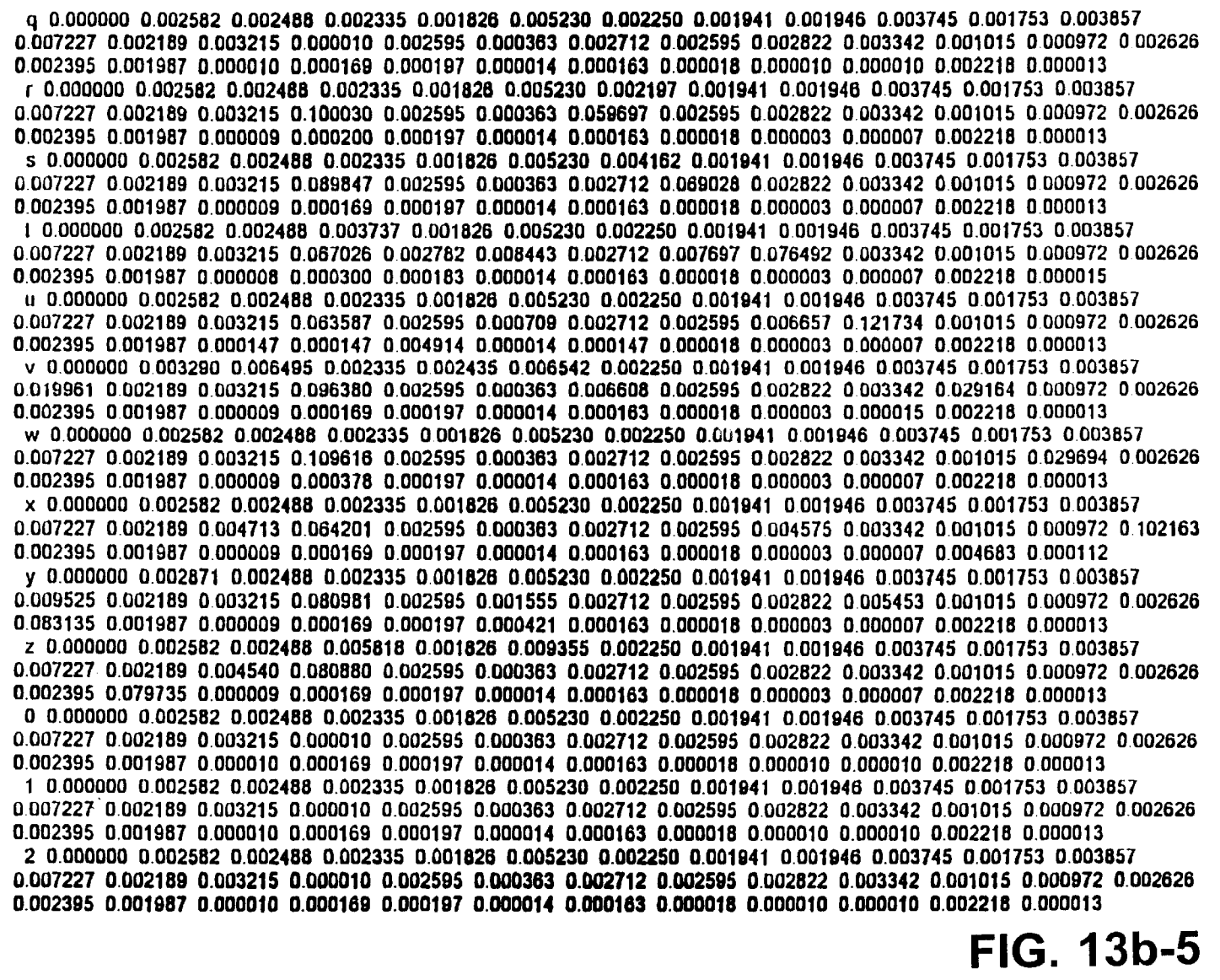
Figure 13B-6:
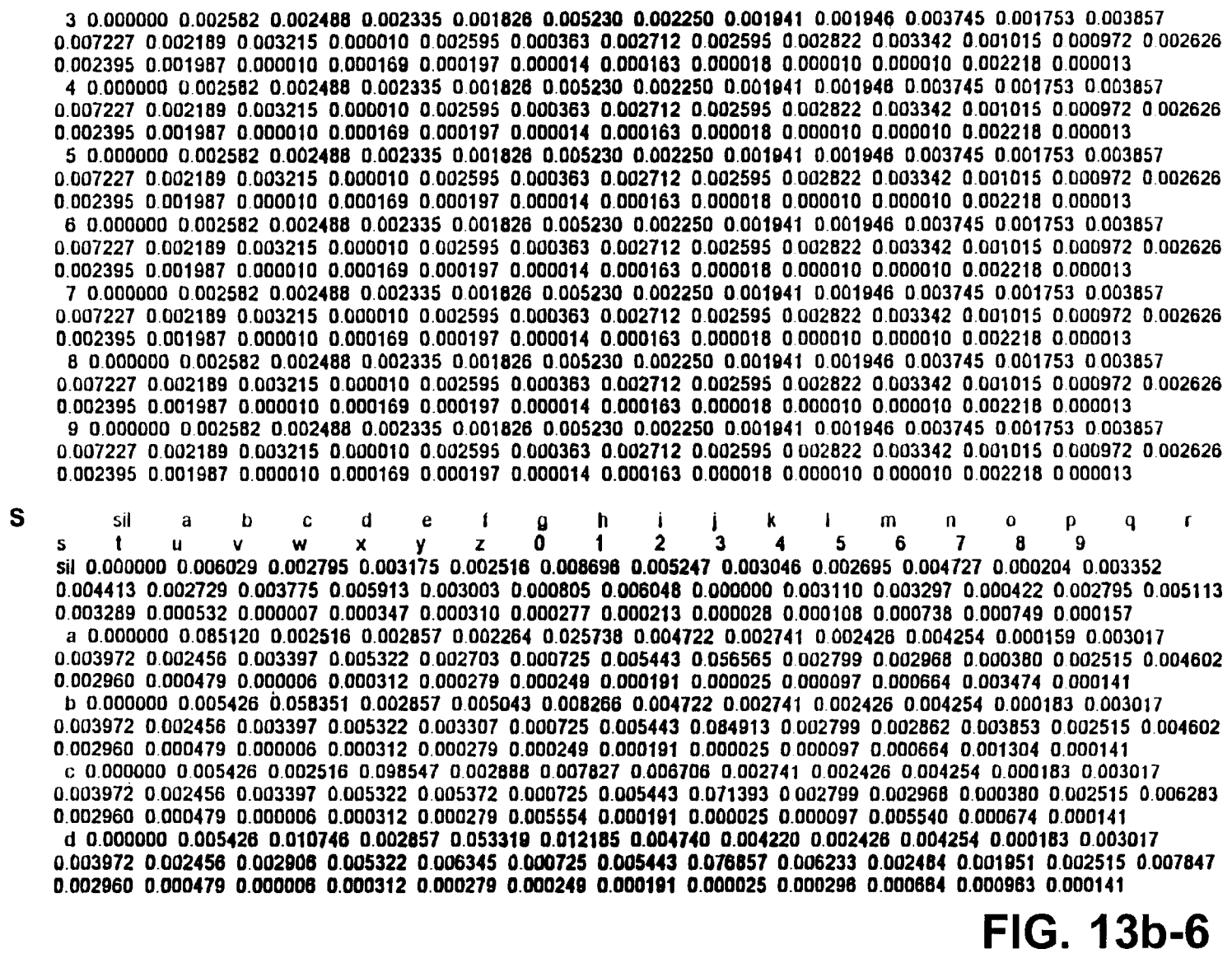
Figure 13B-7:
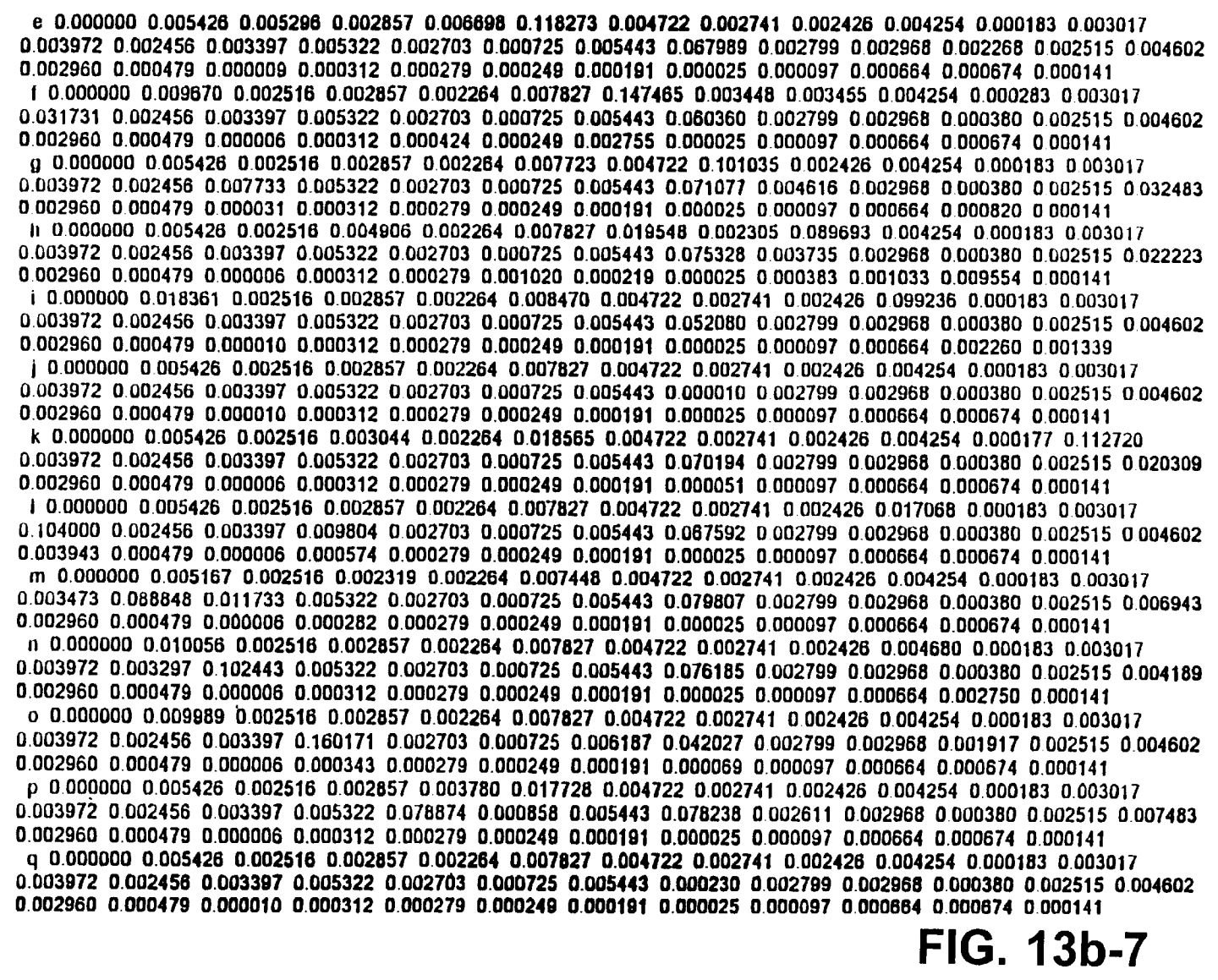
Figure 13B-8:
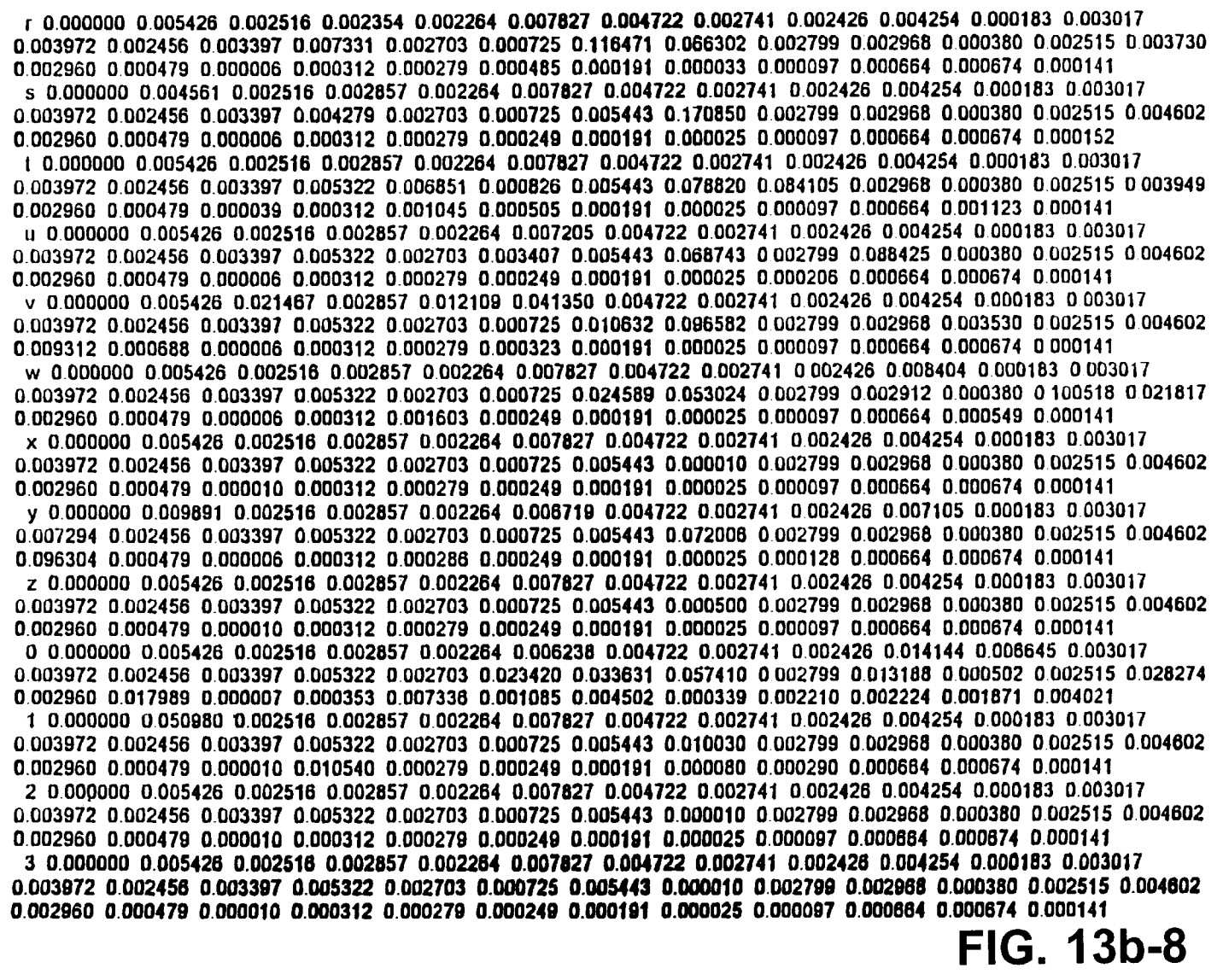
Figure 13B-9:
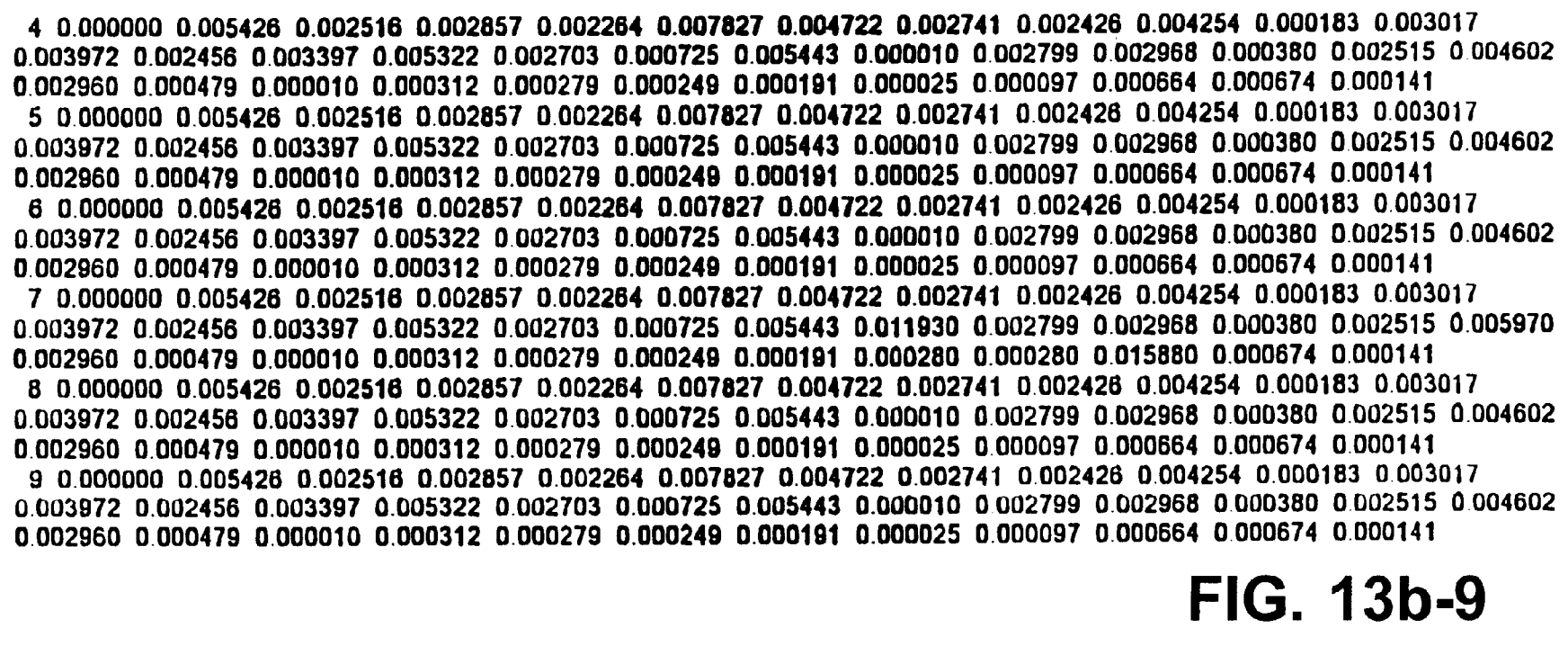

Referring to FIGS. 13A–13B, a few examples of confusability matrixes are shown. FIG. 13A includes confusion values for permutations, FIG. 13B includes confusion values for insertions, and FIG. 13C includes confusion values for deletions. The confusability matrices are shown as matrices of probabilities for ease of description; the code utilizes matrices of natural logs of the probability. The symbols hyphen, period and comma are not shown.

The confusion value corresponding to how likely it would be for the recognizer to confuse the recognized symbol in the nth digit place with the index value in the nth digit place is determined in the context of the symbol in the preceding nth digit place (silence if n=l). The rows of the matrix correspond to the symbol context, the columns of the matrix correspond to the index value, and the header symbol 510 corresponds to the recognized symbol. There are 39 such matrixes, one for each symbol, for permutation, insertion and deletion for a total of 117 matrixes or 39 three dimensional matrixes.

For example, in the case of a permutation, the probability of confusing the recognized letter B with the index value D in the context of silence is 0.011988 and the probability of confusing the recognized letter B with the index value e in the context of a is 0.017751. The probability of confusing the recognized letter O with the index value 4 in the context of t is 0.000258. As the number of digit places increases, the probability is calculated by multiplying the probabilities for each digit place. For example, the probability of confusing the recognized prefix BO with TA is 0.001323×0.001831= 0.000002422. The confusability matrices are experimentally determined as described below.

EXAMPLE

Uttered word: Dosage
List of recognized word: Postage, Post, Postal, Buffalo, Dosing
Spelled prefix: DOS
Prefix recognized: BOS
Confusability algorithm:

Referring to FIGS. 14A–14G in which the calculation of the confusion values is shown for each digit place (only those symbols having confusion values greater than 0.01 are shown for simplicity, generally the cut-off value is 0.000010). In the first digit place, n=1, in the context of silence, the valid prefixes are put in queue 390:

| n | operation | prefix | confusion value |
|---|---|---|---|
| 1 | P | B | 0.655987 |
| 1 | D |   | 0.072822 |
| 1 | P | D | 0.011988 |
| 1 | P | E | 0.011813 |
| 1 | I | E | 0.010596 |

(p = permutation, D = deletion, I = insertion)

$^P$B is pulled from queue 390 as the highest probability prefix in the queue; n is less than 3 and the prior operation was not an insertion so n is incremented; the propagation routine is reentered. Queue 390 becomes:

| n | operation | prefix | confusion value |
|---|---|---|---|
| 2 | P | BO | 0.405482 |
| 2 | D | B | 0.095995 |
| 1 | D |   | 0.072822 |
| 2 | I | BB | 0.055001 |
| 2 | I | BO | 0.050121 |
| 2 | P | BB | 0.015694 |
| 1 | P | D | 0.011988 |
| 1 | P | E | 0.011813 |
| 1 | I | E | 0.010596 |
| 2 | P | BW | 0.010545 |

$^P$BO is pulled from queue 390 as the highest probability prefix in the queue; n is less than 3 and the prior operation was not an insertion so n is incremented; the propagation routine is reentered. Queue 390 becomes (only those possible prefixes having confusion values greater than 0.002 are shown for clarity):

| n | operation | prefix | confusion value |
|---|---|---|---|
| 3 | P | BOS | 0.218691 |
| 2 | D | B | 0.095995 |
| 1 | D |   | 0.072822 |

-continued

| n | operation | prefix | confusion value |
|---|---|---|---|
| 3 | I | BOO | 0.064946 |
| 3 | D | BO | 0.059754 |
| 2 | I | BB | 0.055001 |
| 2 | I | BO | 0.050121 |
| 3 | I | BOS | 0.017041 |
| 3 | P | BOO | 0.016986 |
| 2 | P | BB | 0.015694 |
| 1 | P | D | 0.011988 |
| 1 | P | E | 0.011813 |
| 1 | I | E | 0.010596 |
| 2 | P | BW | 0.010545 |
| 3 | P | BOA | 0.004753 |

$^P$BOS is pulled from queue 390 as the highest probability prefix in the queue; n equals 3 so BOS is moved to top list 292; $^D$B is pulled from queue 390 as the highest probability prefix in the queue; n is less than 3 and the prior operation was not an insertion so n is incremented; the propagation routine is reentered. Queue 390 becomes:

| n | operation | prefix | confusion value |
|---|---|---|---|
| 1 | D |   | 0.072822 |
| 3 | I | BOO | 0.064946 |
| 3 | D | BO | 0.059754 |
| 2 | I | BB | 0.055001 |
| 2 | I | BO | 0.050121 |
| 3 | I | BOS | 0.017041 |
| 3 | P | BOO | 0.016986 |
| 2 | P | BB | 0.015694 |
| 1 | P | D | 0.011988 |
| 1 | P | E | 0.011813 |
| 1 | I | E | 0.010596 |
| 2 | P | BW | 0.010545 |
| 3 | D | B | 0.009121 |
| 3 | P | BOA | 0.004753 |

$^D$ is pulled from queue 390 as the highest probability prefix in the queue; n is less than 3 and the prior operation was not an insertion so n is incremented; the propagation routine is reentered. Queue 390 becomes:

| n | operation | prefix | confusion value |
|---|---|---|---|
| 3 | I | BOO | 0.064946 |
| 2 | P | O | 0.063608 |
| 3 | D | BO | 0.059754 |
| 2 | I | BB | 0.055001 |
| 2 | I | BO | 0.050121 |
| 3 | I | BOS | 0.017041 |
| 3 | P | BOO | 0.016986 |
| 2 | P | BB | 0.015694 |
| 1 | P | D | 0.011988 |
| 1 | P | E | 0.011813 |
| 1 | I | E | 0.010596 |
| 2 | P | BW | 0.010545 |
| 3 | D | B | 0.009121 |
| 2 | D |   | 0.006324 |
| 3 | P | BOA | 0.004753 |

$^I$BOO is pulled from queue 390 as the highest probability prefix in the queue; n equals 3 so BOO is moved to top list 292; $^P$O is pulled from queue 390 as the highest probability prefix in the queue; n is less than 3 and the prior operation was not an insertion so n is incremented; the propagation routine is reentered. Queue 390 becomes:

| n | operation | prefix | confusion value |
|---|---|---|---|
| 3 | D | BO | 0.059754 |
| 2 | I | BB | 0.055001 |
| 2 | I | BO | 0.050121 |
| 3 | P | OS | 0.034306 |
| 3 | I | BOS | 0.017041 |
| 3 | P | BOO | 0.016986 |
| 2 | P | BB | 0.015694 |
| 1 | P | D | 0.011988 |
| 1 | P | E | 0.011813 |
| 1 | I | E | 0.010596 |
| 2 | P | BW | 0.010545 |
| 3 | I | OO | 0.010188 |
| 3 | D | O | 0.009374 |
| 2 | D | B | 0.009121 |
| 2 | D |  | 0.006324 |
| 3 | P | BOA | 0.004753 |
| 3 | I | OS | 0.002673 |
| 3 | P | OO | 0.002665 |

$^D$BO is pulled from queue 390 as the highest probability prefix in the queue; n equals 3 so BO is moved to top list 292; $^I$BB is pulled from queue 390 as the highest probability prefix in the queue; n is less than 3 and the prior operation was an insertion so n is not incremented; the propagation routine is reentered and does not yield any valid prefixes. $^I$BO is pulled from queue 390 as the highest probability prefix in the queue; n is less than 3 and the prior operation was an insertion so n is not incremented; the propagation routine is reentered. Queue 390 becomes:

| n | operation | prefix | confusion value |
|---|---|---|---|
| 3 | P | OS | 0.034306 |
| 2 | P | BOO | 0.028937 |
| 3 | I | BOS | 0.017041 |
| 3 | P | BOO | 0.016986 |
| 2 | P | BB | 0.015694 |
| 1 | P | D | 0.011988 |
| 1 | P | E | 0.011813 |
| 1 | I | E | 0.010596 |
| 2 | P | BW | 0.010545 |
| 3 | I | OO | 0.010188 |
| 3 | D | O | 0.009374 |
| 2 | D | B | 0.009121 |
| 2 | I | BOO | 0.008720 |
| 2 | D |  | 0.006324 |
| 3 | P | BOA | 0.004753 |
| 3 | I | OS | 0.002673 |
| 3 | P | OO | 0.002665 |

$^P$OS is pulled from queue 390 and moved to top list 292; $^P$BOO is pulled from queue 390 as the highest probability prefix in the queue; n is less than 3 and the prior operation was not an insertion so n is incremented; the propagation routine is reentered. Queue 390 becomes:

| n | operation | prefix | confusion value |
|---|---|---|---|
| 3 | I | BOS | 0.017041 |
| 3 | P | BOO | 0.016986 |
| 2 | P | BB | 0.015694 |
| 3 | P | BOOS | 0.015607 |
| 1 | P | D | 0.011988 |
| 1 | P | E | 0.011813 |
| 1 | I | E | 0.010596 |
| 2 | P | BW | 0.010545 |
| 3 | I | OO | 0.010188 |
| 3 | D | O | 0.009374 |
| 2 | D | B | 0.009121 |
| 2 | I | BOO | 0.008720 |
| 2 | D |  | 0.006324 |
| 3 | P | BOA | 0.004753 |
| 3 | I | BOOO | 0.004635 |
| 3 | D | BOO | 0.004264 |
| 3 | I | OS | 0.002673 |
| 3 | P | OO | 0.002665 |

$^I$BOS is pulled from queue 390 as the highest probability prefix in the queue; n equals 3 but this is a repeat lowered value prefix so it is dropped. $^P$BOO is pulled from queue 390 and similarly dropped. FIG. 14 follows the propagation routine through $^P$DO. The process is continued until queue 390 is exhausted or there are one hundred and fifty prefixes in top list 292. The top 13 prefixes are shown in FIG. 15.

Discrete rerecognition of the top one hundred and fifty prefixes against the uttered prefix 230 yields three prefixes in ranked order. If the top recognized prefix 242 from the original discrete recognition of the uttered word (POS) is already included in ranked list 264 it is not added. Corresponding words 240 are hypothesized:

| prefixes | hyothesized words 240 |
|---|---|
| BOS | boscage, boskage, bosh, bosk, etc. |
| POS | posada, pose, Poseidon, poser, etc. |
| DOS | dos, dosage, dose, dosido, dosimeter, doss, dossal, dossier, dost |

Ranked word list 247 is formed from discrete rerecognition against the uttered word 232:

|  |
|---|
| postage |
| dosage |
| boscage |
| boskage |
| dossal |
| dossier |
| poser |

The distance parameters associated with prefixes 264 are then added to the distance parameters of words 247 that include corresponding prefixes and ranked list 247 is reranked according to the new distance parameters. The reranked list is then displayed to the user for selection.

Figure 17:
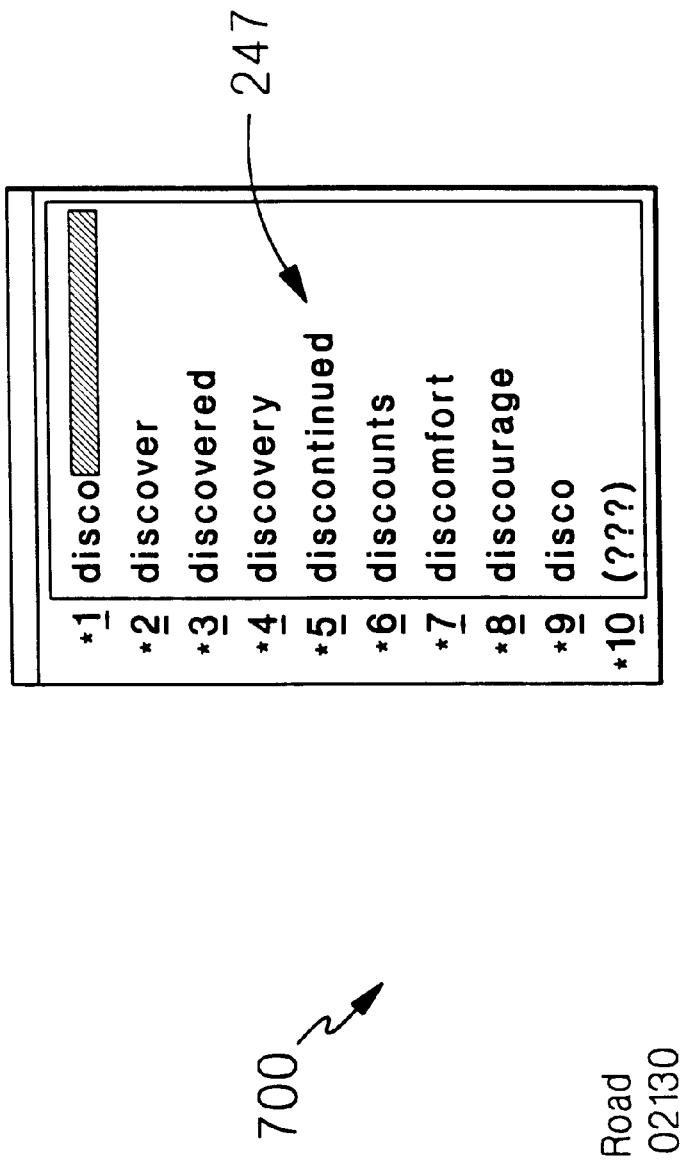
FIG. 17 is a diagrammatic representation of a user interface.

Referring to FIG. 17, a user interface 700 permitting a user to select from ranked word list 247 is shown. Here, the word was disco, the recognizer recognized fiscal, the user spelled DIS, and disco appeared as choice 9 in list 247. Selecting 9 on a keyboard (not shown) replaces fiscal with disco.

Figure 16A:
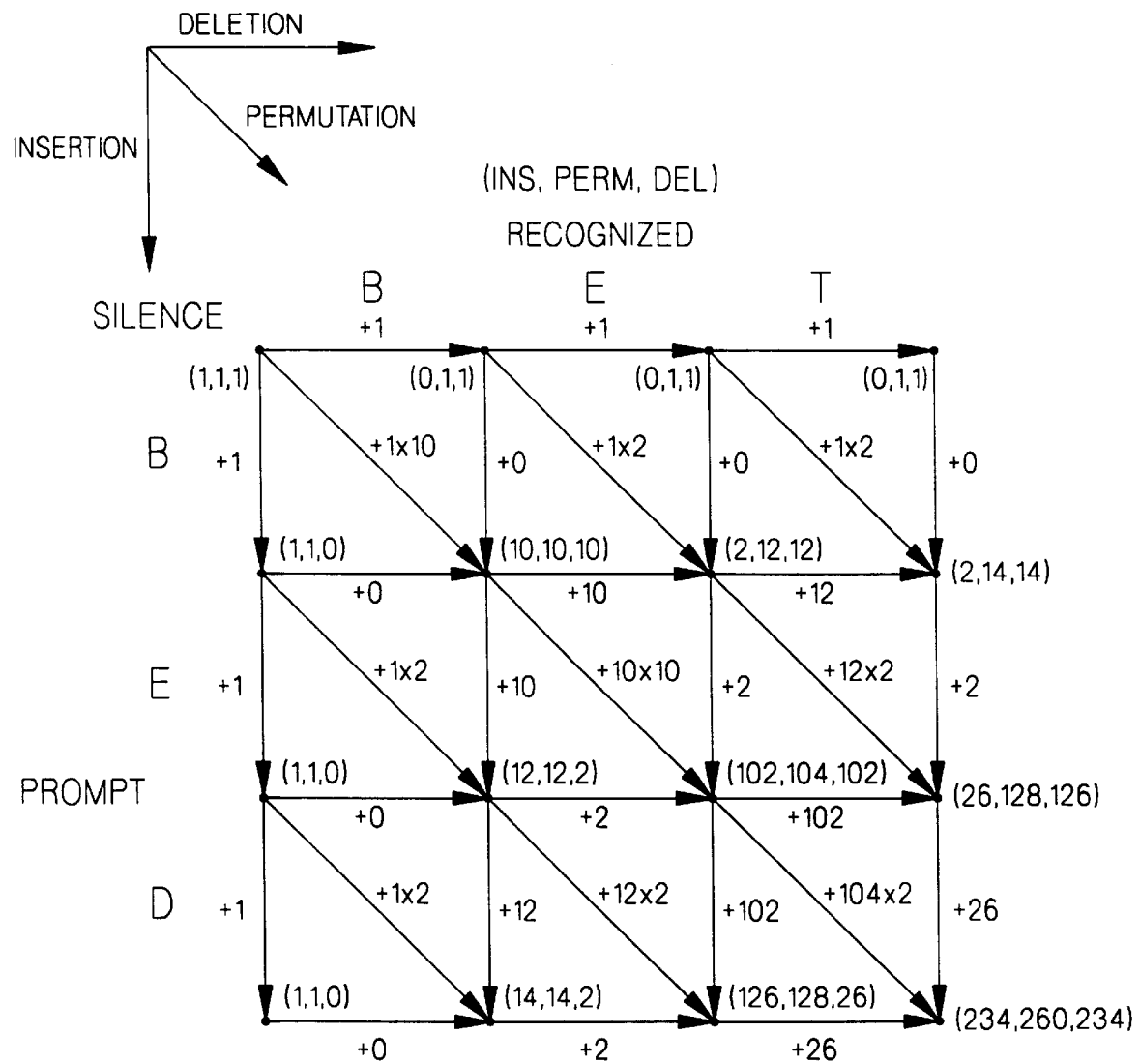
FIGS. 16A–16B are forward and backward diagrams representing Baum Welsh training.
Figure 16B:
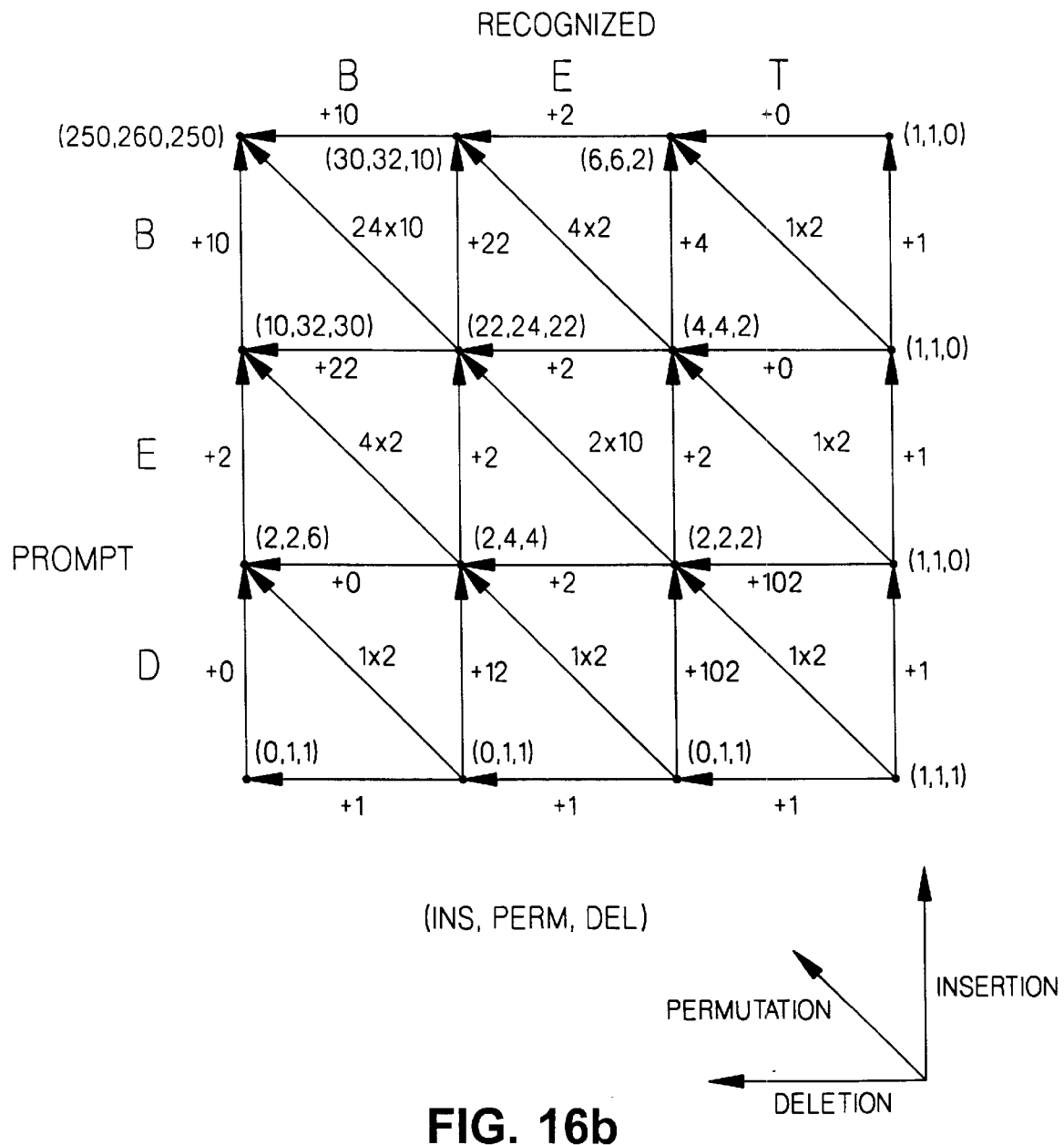

The confusability matrices are experimentally determined by having a user spell predetermined words to the speech recognizer and comparing the recognized spelling to the known spelling. Referring to FIGS. 16A–16B, the training algorithm prompts the user to spell BED. The user spells BED and the recognizer recognizes BET. Baum Welsh training in the context of Hidden Markov Models is a standard technique in speech recognition. See, for example, Rabiner, L. R., and Juang, B. H., "Introduction to Hidden Markov Models," *IEEE ASSP,* pp. 4–16, January 1986. The invention utilizes a modification of Baum Welsh training to determine the probability of permutations, insertions and deletions for each symbol in the context of each symbol.

Permutations build diagonally, deletions horizontally, and insertions vertically. Permutations feed all three nodal points, deletions feed permutation and deletion nodal points, and insertions feed permutation and insertion nodal points. The points in each nodal point are arranged as (insertion, permutation, deletion). Permutations have an additional factor of 10 if the letter is correct and a factor of 2 if the letter is not correct.

In the forward alpha direction of FIG. 16A, the silence node starts with values of (1, 1, 1) for (insertion, permutation, deletion) respectively. All other nodal points start with values of (0, 0, 0). In the backward beta direction of FIG. 16B, the lower right hand node starts with values of (1, 1, 1) and all other nodal points start with values of (0, 0, 0). The forward and backward diagrams are used to calculate confusability probabilities as follows:

| node | context | prompt | recog. | alpha | beta | probability |
|------|---------|--------|--------|-------|------|-------------|
| ins  | Sil     | B      | B      | 1     | 22   | (1/260*22/260)*10 |
| per  | Sil     | B      | B      | 1     | 24   | (1/260*24/260) |
| del  | Sil     | B      |        | 1     | 22   | (1/260*22/260) |
| ins  | B       | E      | E      | 10    | 2    | (10/260*2/260)*10 |
| per  | B       | E      | E      | 10    | 2    | (10/260*2/260) |
| del  | B       | E      |        | 10    | 2    | (10/260*2/260) |
| ins  | B       | E      | B      | 1     | 2    | (1/260*2/260) |
| per  | B       | E      | B      | 1     | 4    | (1/260*4/260) |
| del  | B       | E      |        | 0     | 4    | (0/260*4/260) |
| ins  | Sil     | B      | T      | 0     | 1    | (0/260*1/260) |
| per  | Sil     | B      | T      | 1     | 1    | (1/260*1/260) |
| del  | Sil     | B      |        | 1     | 0    | (1/260*0/260) |
| ins  | E       | D      | E      | 12    | O    | (12/260*0/260) |
| per  | E       | D      | E      | 12    | 1    | (12/260*1/260) |
| del  | E       | D      |        | 2     | 1    | (2/260*1/260) |

Repetitive probabilities for the same node (operation), context, prompt and recognized symbol are added to determine the probability of confusing the recognized symbol with the prompt. This procedure is carried out until the proportions between the confusions becomes more or less stable indicated that a majority of confusion phenomena have been captured. Anomalies in the data can be smoothed by looking at related confusions, i.e., the probability of confusing e with a in the context of b is related to the probability of confusing a with e in the context of b. It is useful to have several speakers participate in the training process to capture a large variety of possible confusion errors. The resulting matrix may be customized for a particular user.

Figure 9:
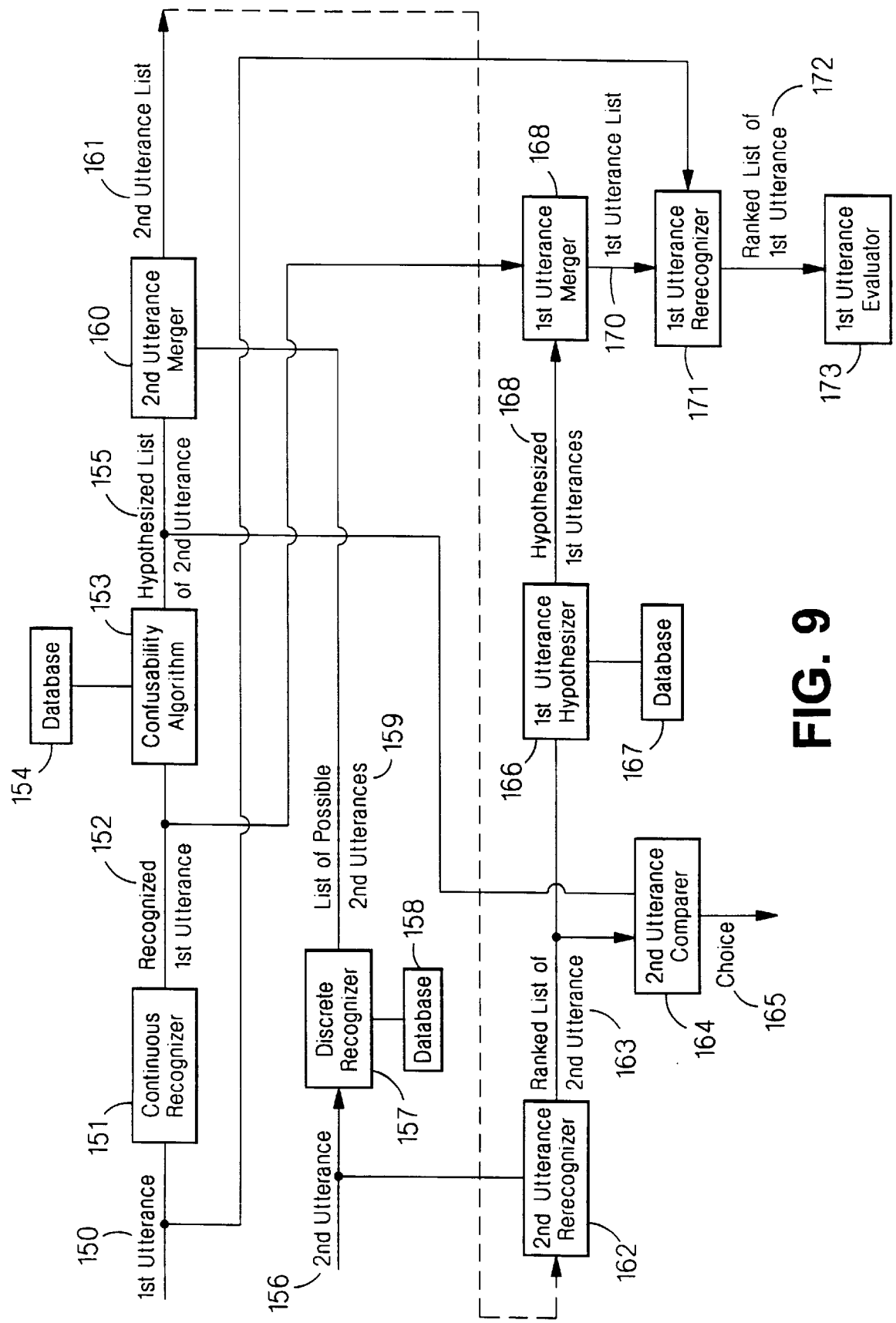
FIG. 9 is a functional block diagram of a recognition system.

Speech recognition in accordance with the invention can be performed whenever there are two or more utterances that include related data, e.g., knowing the city and state the zip code is known, knowing the spelling of a word the word is known. Other examples of related data are inventory name and number, flight origination/destination and flight number. A database containing the relationships between the data is consulted to hypothesize one set of data from the other. Referring to FIG. 9, a first utterance 150 is recognized 151 by continuous recognition. A confusability algorithm 153 creates a ranked list including entries that the recognizer would be likely to confuse with the recognized utterance 152 and hypothesizes a list of second utterances 155 by consulting a database 154.

A discrete recognizer 157 recognizes a second utterance 156 (second utterance 156 contains data redundant with first utterance 150) by recognizing the utterance against a database 158 and creates a list of possible second utterances 159. The hypothesized list of second utterances 155 and the list of possible second utterances 159 are merged 160 to form a second utterance list 161. Second utterance list 161 is discretely rerecognized 162 against the second utterance 156 and a ranked list of second utterances 163 is formed. Ranked list of second utterances 163 is compared 164 to hypothesized second utterances 155, the top ranked second utterance being compared first. The first ranked second utterance that shows up in the hypothesized second utterances 155 is chosen 165.

If the choice is incorrect or the ranked list is exhausted without finding commonality, possible first utterances are hypothesized 166 from the ranked list of second utterances 163 by consulting a database 167 to form a list of hypothesized first utterances 168. The recognized first utterance 152 is merged 169 with the hypothesized first utterances 168 and the resulting first utterance list 179 is discretely rerecognized 171 against the original first utterance 150 to form a ranked list of first utterances 172. The second first utterance on the ranked list is evaluated 173.

The speech recognizer is able to inform the user of bad data, i.e., no commonality was found between ranked list of second utterances 163 and hypothesized second utterances 155, and the second first utterance on the ranked list 172 has a distance parameter that is beyond the acceptable limit.

Other embodiments are within the scope of the following claims. The first and second utterances can be two parts of one utterance. The recognition system can be used with an optical character recognizer instead of a speech recognizer.

What is claimed is:

1. A method of speech recognition including:
   recognizing a first spoken utterance to identify a recognized first utterance corresponding to the first spoken utterance,
   recognizing a second spoken utterance having information that is related to said first spoken utterance to identify a recognized second utterance corresponding to the second spoken utterance, and
   determining most probable first and second utterances based on the recognized first and second utterances and on stored data about valid relationships between possible first and second utterances, wherein the most probable second utterance and the most probable first utterance are redundant representations expressing the same meaning.

2. The method of claim 1 further including determining validity of one of the recognized first and second utterances, including an invalid recognized utterance in a list of possible utterances, and comparing the invalid recognized utterance with other possible utterances in said list.

3. The method of claim 1 wherein determining the most probable first and second utterances includes rerecognition of one of said spoken utterances against a list of possible utterances.

4. The method of claim 3 further including ranking said list of possible utterances based upon how closely each of the possible utterances corresponds to said one of said spoken utterances.

5. The method of claim 1 further including creating a list of hypothesized possible utterances that relate to at least one of said recognized utterances based on said stored data.

6. The method of claim 5 further including creating and ranking a list of possible utterances based upon how closely each of the possible utterances corresponds to one of said spoken utterances and comparing said ranked list of possible utterances to said list of hypothesized possible utterances for commonality between said lists.

7. The method of claim 1 further including creating a list of possible utterances that could be confused with at least one of said recognized utterances.

8. The method of claim 1 wherein said recognized first utterance is recognized continuously.

9. The method of claim 8 further including creating a list of possible first utterances that may be confused with said recognized first utterance.

10. The method of claim 9 further including creating a list of hypothesized possible second utterances that relate to said possible first utterances in said list of possible first utterances based on said stored data.

11. The method of claim 10 further including adding said recognized second utterance to said list of hypothesized possible second utterances to create a merged list of possible second utterances.

12. The method of claim 11 further including rerecognizing said merged list of possible second utterances against said second spoken utterance to get a ranked list of possible second utterances, said ranking based upon how closely each possible second utterance in said merged list corresponds to said second spoken utterance.

13. The method of claim 12 further including comparing said ranked list of possible second utterances to said list of hypothesized possible second utterances for commonality between said lists, a highest ranked possible second utterance in said ranked list being compared first.

14. The method of claim 13 further including creating a list of hypothesized possible first utterances from said ranked list of possible second utterances based on said stored data.

15. The method of claim 14 further including adding said recognized first utterance to said hypothesized list of possible first utterances to create a merged list of possible first utterances.

16. The method of claim 15 further including rerecognizing said merged list of possible first utterances against said first spoken utterance to get a ranked list of possible first utterances having a ranking based upon how closely each possible first utterance in said merged list of possible first utterances corresponds to said first spoken utterance.

17. The method of claim 16 further including evaluating a possible first utterance ranked second in said ranked list of possible first utterances by determining whether a distance parameter associated with said second ranked possible first utterance is within an acceptable limit.

18. The method of claim 17 further including indicating to a user when said second ranked possible first utterance is not within said acceptable limit and no commonality exists between said ranked list of possible second utterances and said list of hypothesized possible second utterances.

19. The method of claim 1 wherein said recognized second utterance is recognized discretely.

20. The method of claim 1 wherein said first spoken utterance comprises a zipstate and said second spoken utterance comprises a city from a destination address on a package, said determination of the most probable first and second utterances resulting in the sorting of said package according to the package's destination address.

21. The method of claim 1 wherein said first spoken utterance comprises a word and said second spoken utterance comprises spelled prefix including ordered symbols.

22. The method of claim 21 further including creating a list of possible prefixes that could be confused with said recognized second utterance.

23. The method of claim 22 wherein said recognized second utterance comprises at least one symbol and creating said list of possible prefixes includes determining, in the context of a preceding symbol or silence, a probability of confusing each symbol in said recognized second utterance with each symbol in a list of possible symbols.

24. The method of claim 22 wherein said recognized second utterance comprises at least one symbol and creating said list of possible prefixes includes determining, in the context of a preceding symbol or silence, a probability of confusing each symbol in said recognized second utterance with more than one symbol.

25. The method of claim 22 wherein said recognized second utterance comprises at least one symbol and creating said list of possible prefixes includes determining, in the context of a preceding symbol or silence, a probability of confusing each symbol in said recognized second utterance with an absence of a symbol.

26. The method of claim 22 wherein creating said list of possible prefixes includes replacing a sequence of symbols with a single symbol.

27. The method of claim 21 wherein said first spoken utterance comprises a spelled word and said determination of the most probable first and second utterances results in recognizing said spelled word.

28. A method of generating a choice list from a continuously recognized utterance comprising:
    recognizing a spoken utterance comprising a series of symbols to identify a recognized utterance corresponding to the spoken utterance,
    consulting stored information including confusion values for each symbol in the series of symbols to determine the probability of confusing possible utterances with said recognized utterance, said confusion values representing the probability of confusing each symbol in the series of symbols with each symbol in a list of possible symbols, symbols from said list of possible symbols being combined to form each possible utterance of said possible utterances, and
    producing a list of possible utterances from the stored information that could be confused with the recognized utterance.

29. The method of claim 28 further including rerecognizing said spoken utterance against a merged list of said list of possible utterances and said recognized utterance to create a ranked list of possible utterances having a ranking based upon how closely each utterance in said merged list corresponds to said spoken utterance.

30. The method of claim 28 wherein said spoken utterance is recognized continuously.

31. A method of recognizing ambiguous inputs including:
    recognizing a first ambiguous input to identify a recognized first input corresponding to the first ambiguous input,
    recognizing a second ambiguous input having information that is related to said first ambiguous input to identify a recognized second input corresponding to the second ambiguous input, and
    determining most probable first and second ambiguous inputs based on the recognized first and second inputs and on stored data about valid relationships between possible first and second ambiguous inputs, wherein the most probable second ambiguous input and the most probable first ambiguous input are redundant representations expressing the same meaning.

32. A method of training a speech recognizer, comprising:
    prompting a user to make an utterance comprising a series of symbols, each said symbol consisting of one of a letter, digit, and punctuation,
    recognizing said utterance, and
    calculating the probability of confusing each symbol of the recognized utterance with the symbol in the corresponding digit place of the prompted utterance.

33. The method of claim 32 wherein said probability is calculated within the context of the preceding symbol or silence.

34. A method of displaying word choices during speech recognition, comprising:

recognizing an uttered word, recognizing an uttered spelling of a prefix of the uttered word, whereby symbols are used to spell said prefix, and displaying a list of word choices on a screen for selection, a top choice on the list corresponding to a highest ranked choice.

35. The method of claim 34 wherein said symbols comprise letters, digits, and punctuation.

36. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, and determining most probable first and second utterances based on the recognized first and second utterances and on stored data about valid relationships between possible first and second utterances, including creating a list of hypothesized possible utterances that relate to at least one of said recognized spoken utterances based on said stored data, and creating and ranking a list of possible utterances based upon how closely each of the possible utterances corresponds to one of said spoken utterances and comparing said ranked list of possible utterances to said list of hypothesized possible utterances for commonality between said lists.

37. A method of speech recognition including:

recognizing a first spoken utterance by continuous recognition to identify a recognized first utterance corresponding to the first spoken utterance, recognizing a second spoken utterance having information that is related to said first spoken utterance to identify a recognized second utterance corresponding to the second spoken utterance, and determining most probable first and second utterances based on the recognized first and second utterances and on stored data about valid relationships between possible first and second utterances, including creating a list of possible first utterances that may be confused with said recognized first utterance.

38. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, and determining the most probable first and second utterances based on the recognized first and second utterances and on stored data about valid relationships between possible first and second utterances, wherein said first spoken utterance comprises a zipstate and said second spoken utterance comprises a city from a destination address on a package, said determination of the most probable first and second utterances resulting in the sorting of said package according to the package's destination address.

39. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, and determining the most probable first and second utterances based on the recognized first and second utterances and on stored data about valid relationships between possible first and second utterances, wherein said first spoken utterance comprises a word and said second spoken utterance comprises spelled prefix including ordered symbols.

40. A method of generating a choice list from a continuously recognized utterance comprising:

recognizing a spoken utterance to identify a recognized first utterance corresponding to the spoken utterance, consulting stored information to determine the probability of confusing possible utterances in the stored information with said recognized utterance, producing a list of possible utterances from the stored information that could be confused with the recognized utterance, and rerecognizing said spoken utterance against a merged list of said list of possible utterances and said recognized utterance to create a ranked list of possible utterances having a ranking based upon how closely each utterance in said merged list corresponds to said spoken utterance.

41. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, determining most probable first and second utterances based on the recognized first and second utterances and on stored data about valid relationships between possible first and second utterances, wherein the most probable second utterance contains information that is semantically related to the most probable first utterance, and creating a list of possible utterances that could be confused with at least one of said recognized utterances.

42. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, and determining most probable first and second utterances based on the recognized first and second utterances and on stored data about valid relationships between possible first and second utterances, wherein the most probable second utterance contains information that is semantically related to the most probable first utterance, wherein said first spoken utterance comprises a word and said second spoken utterance comprises spelled prefix including ordered symbols, the method further including creating a list of possible prefixes that could be confused with said recognized second utterance.

43. A method of speech recognition including:

recognizing a first spoken utterance to identify a recognized first utterance corresponding to the first spoken utterance, recognizing a second spoken utterance having information that is related to said first spoken utterance to identify a recognized second utterance corresponding to the second spoken utterance, and determining most probable first and second utterances based on the recognized first and second utterances and on stored data about valid relationships between possible first and second utterances, wherein the most probable second utterance contains information that is semantically related to the most probable first utterance, wherein said first spoken utterance comprises a spelled word and said second spoken utterance comprises spelled prefix including ordered symbols, said determination of the most probable first and second utterances results in recognizing said spelled word.

* * * * *